(12) United States Patent
Lightstone et al.

(10) Patent No.: US 9,408,095 B2
(45) Date of Patent: Aug. 2, 2016

(54) AUTONOMOUS DETERMINATION OF OVERLAPPING COVERAGE IN HETEROGENEOUS NETWORKS

(71) Applicant: Telefonaktiebolaget L M Ericsson (publ), Stockholm (SE)

(72) Inventors: Leonard Lightstone, Ottawa (CA); Christopher Richards, Ottawa (CA); Edward Mah, Kanata (CA); Karl D. Mann, Ottawa (CA); Adrien Comeau, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 100 days.

(21) Appl. No.: 14/241,796

(22) PCT Filed: Feb. 5, 2014

(86) PCT No.: PCT/IB2014/058817
§ 371 (c)(1),
(2) Date: Feb. 27, 2014

(87) PCT Pub. No.: WO2015/118381
PCT Pub. Date: Aug. 13, 2015

(65) Prior Publication Data
US 2015/0223084 A1  Aug. 6, 2015

(51) Int. Cl.
*H04L 12/26* (2006.01)
*H04W 24/08* (2009.01)
(Continued)

(52) U.S. Cl.
CPC ............. *H04W 24/08* (2013.01); *H04L 5/0048* (2013.01); *H04W 24/00* (2013.01); *H04W 24/10* (2013.01); *H04W 48/16* (2013.01); *H04W 72/042* (2013.01)

(58) Field of Classification Search
CPC ....................................................... H04L 47/10
USPC ........................................................... 370/252
See application file for complete search history.

(56) References Cited

U.S. PATENT DOCUMENTS

2013/0294272 A1    11/2013   Xiao et al.
2014/0056224 A1*    2/2014   Rubin et al. .................. 370/328
2014/0058778 A1*    2/2014   McLarty et al. ............. 705/7.19

FOREIGN PATENT DOCUMENTS

WO         2008032154 A1     3/2008

OTHER PUBLICATIONS

Author Unknown, "3rd Generation Partnership Project; Technical Specification Group Radio Access Network; Evolved Universal Terrestrial Radio Access (E-UTRA); Radio Resource Control (RRC); Protocol Specification (Release 12)," Technical Specification 36.331, 3GPP Organizational Partners, Dec. 2013, Version 12.0.0, 349 pages.

(Continued)

*Primary Examiner* — Christopher R Crompton
(74) *Attorney, Agent, or Firm* — Withrow & Terranova, PLLC

(57) ABSTRACT

Systems and methods are disclosed for autonomously determining overlapping coverage in a cellular communications network. In one embodiment, the cellular communications network is a heterogeneous cellular communications network. In one embodiment, a network node of a cellular communication system obtains information (e.g., pilot reports) indicative of a perceived coverage of one or more covering cells at wireless devices within a measuring cell over a measurement interval. The network node determines overlapping coverage of the measuring cell and the one or more covering cells based on the information indicative of the perceived coverage of the one or more covering cells at the wireless devices.

31 Claims, 16 Drawing Sheets

(51) Int. Cl.
*H04L 5/00* (2006.01)
*H04W 72/04* (2009.01)
*H04W 48/16* (2009.01)
*H04W 24/00* (2009.01)
*H04W 24/10* (2009.01)

(56) References Cited

OTHER PUBLICATIONS

Author Unknown, "3rd Generation Partnership Project; Technical Specification Group Radio Access Network; Evolved Universal Terrestrial Radio Access (E-UTRA) and Evolved Universal Terrrestrial Radio Access Network (E-UTRAN); Overall description; Stage 2 (Release 12)," Technical Specification 36.300, 3GPP Organizational Partners, Dec. 2013, Version 12.0.0, 208 pages.

Chandra, A., et al., "Enhanced New Improvement Algorithm in WSN with Efficient Transmission for Energy-Saving," International Journal of Engineering Research and Applications, vol. 3, No. 5, Sep.-Oct. 2013, pp. 1127-1132.

Catt, "Inter-frequency scenario support for Load Indication procedure for TDD (R3-132024)," Change Request, 3rd Generation Partnership Project (3GPP TSG-RAN3 Meeting #82), Nov. 11-15, 2013, 2 pages, San Francisco, California.

International Search Report and Written Opinion for PCT/IB2014/058817 mailed Nov. 25, 2014, 12 pages.

\* cited by examiner

| | REPRESENTATIVE CQI | 1 | 2 | | 13 | 14 | 15 |
|---|---|---|---|---|---|---|---|
| 400 | | | | | | | |
| 402 | TARGET (MINIMUM STATISTICALLY RELEVANT NUMBER OF SAMPLED PILOT REPORTS FOR EACH REPRESENTATIVE CQI) | N1 | N2 | | N13 | N14 | N15 |
| 404 | FOR PILOT REPORTS REPORTING PILOT SIGNAL STRENGTH OF PILOT SIGNALS FROM CELL A; PERCENTAGE OF SAMPLED PILOT REPORTS AT THIS REPRESENTATIVE CQI, REPORTING PILOT SIGNAL STRENGTH ABOVE THRESHOLD T1 | 100% | 100% | | 100% | 100% | 100% |
| 406 | FOR PILOT REPORTS REPORTING PILOT SIGNAL STRENGTH OF PILOT SIGNALS FROM CELL B; PERCENTAGE OF SAMPLED PILOT REPORTS AT THIS REPRESENTATIVE CQI, REPORTING PILOT SIGNAL STRENGTH ABOVE THRESHOLD T1 | 85% | 95% | | 100% | 100% | 100% |
| 408 | FOR PILOT REPORTS REPORTING PILOT SIGNAL STRENGTH OF PILOT SIGNALS FROM CELL C; PERCENTAGE OF SAMPLED PILOT REPORTS AT THIS REPRESENTATIVE CQI, REPORTING PILOT SIGNAL STRENGTH ABOVE THRESHOLD T1 | 25% | 30% | | 10% | 0% | 0% |
| 410 | FOR PILOT REPORTS REPORTING PILOT SIGNAL STRENGTH OF PILOT SIGNALS FROM CELL D; PERCENTAGE OF SAMPLED PILOT REPORTS AT THIS REPRESENTATIVE CQI, REPORTING PILOT SIGNAL STRENGTH ABOVE THRESHOLD T1 | 100% | 100% | | 30% | 20% | 20% |

*FIG. 6*

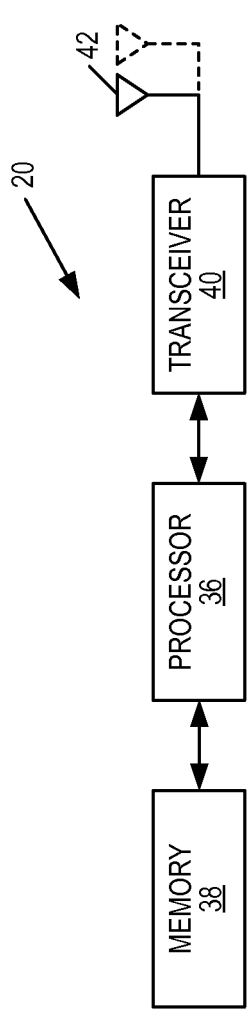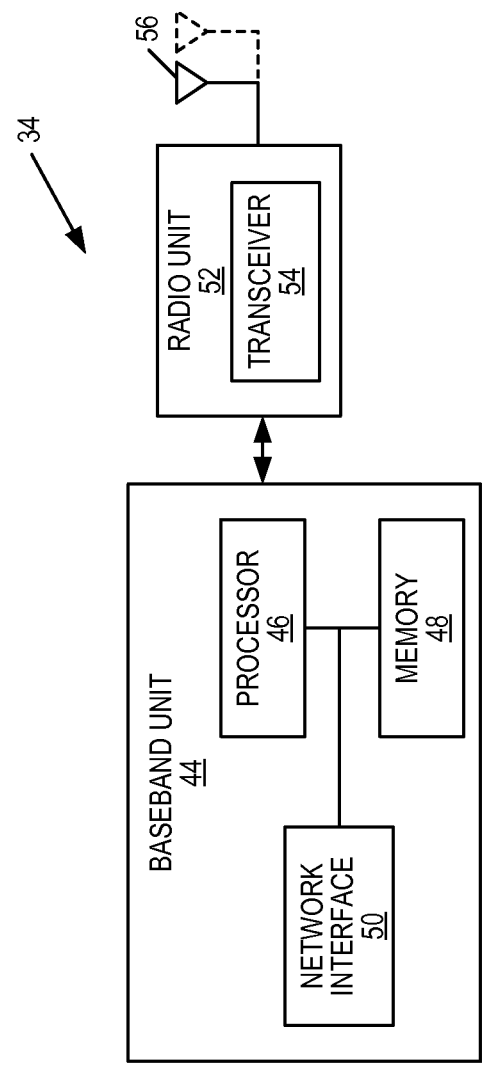

AUTONOMOUS DETERMINATION OF OVERLAPPING COVERAGE IN HETEROGENEOUS NETWORKS

This application is a 35 U.S.C. §371 national phase filing of International Application No. PCT/IB2014/058817, filed Feb. 5, 2014, the disclosure of which is incorporated herein by reference in its entirety.

RELATED APPLICATIONS

There are no related applications.

FIELD OF THE DISCLOSURE

The present disclosure relates to a cellular communications network and more particularly relates to a cellular communications network in which overlapping coverage is autonomously determined.

BACKGROUND

In cellular communications networks such as $3^{rd}$ Generation Partnership Project (3GPP) Long Term Evolution (LTE) networks, there are two types of deployments, namely a homogenous network and a heterogeneous network. A homogeneous network utilizes a single layer, or tier, of radio network nodes. In one particular example, all radio network nodes in a homogeneous network are high power nodes (HPN) such as wide area base stations serving macro cells. As another example, all radio network nodes in a homogeneous network are low power nodes (LPN), e.g., local area base stations serving pico cells. When there are similar load levels in the different cells of a homogeneous network, a wireless device, which is sometimes referred to as a User Equipment device (UE) or terminal, typically receives equally strong signals from a serving or measured cell and from a closest neighboring cell(s), especially when the UE is located in the in the cell border region. Therefore, in a homogeneous network, resource partitioning between serving and neighboring cells for the purpose of inter-cell interference mitigation is not as critical as in heterogeneous networks.

A heterogeneous network includes two or more layers of radio network nodes. In particular, each layer of the heterogeneous network is served by one type, or class, of base stations (BSs). Each layer, or set, of base stations has a fundamentally different set of attributes in one or more of the following: coverage extent or maximum transmit power (e.g., macro, micro, pico, or femto), carrier frequency (possibly multiple, overlapping, or non-overlapping with the carriers of other layers), and radio access technology (RAT). In one embodiment, a heterogeneous network includes a set of high power nodes (e.g., a set of high power or macro base stations) and a set of low power nodes (e.g. a set of low power or medium range, local area, or home base stations) in the same geographical region. A BS power class is defined in terms of maximum output power and other radio requirements (e.g. frequency error, etc.) which depend upon the maximum output power. The maximum output power, Pmax, of the base station is the mean power level per carrier measured at the antenna connector in specified reference condition. The rated output power, PRAT, of the base stations for different BS power classes is expressed in Table 1 below.

TABLE 1

Base Station rated output power in LTE (FDD and TDD)

| BS class | PRAT |
| --- | --- |
| Wide Area BS | - (note) |
| Medium Range BS | ≤+38 dBm |
| Local Area BS | ≤+24 dBm |
| Home BS | ≤+20 dBm (for one transmit antenna port) |
| | ≤+17 dBm (for two transmit antenna ports) |
| | ≤+14 dBm (for four transmit antenna ports) |
| | <+11 dBm (for eight transmit antenna ports) |

NOTE:
There is no upper limit for the rated output power of the Wide Area Base Station.

As stated above, some of the requirements may also differ between BS classes. A wide area BS serves a macro cell, a medium range BS serves a micro cell, a local area BS serves a pico cell, and a home BS serves a femto cell. Typically, a wide area BS is regarded as HPN, whereas all the remaining classes of BSs can be regarded as LPN.

In a two layer macro-pico heterogeneous network, the macro cell and pico cell layers typically include wide area base stations, which are also known as macro base stations, and local area base stations, which are also known as pico base stations, respectively. The high data rate wireless devices located close to the pico base stations (i.e. in the pico layer) can be offloaded from the macro layer to the pico layer. A more complex heterogeneous deployment may include three layers, namely, a macro layer, a micro layer that is served by medium range base stations, and a pico layer. An even more complex heterogeneous deployment may include three layers, namely, a macro layer, a pico layer, and a home or femto layer.

With respect to a heterogeneous network, macro-cells are typically deployed to provide ubiquitous coverage while smaller cells are deployed to (a) boost overall capacity by serving hot-spots, or (b) address holes in the macro-cell coverage. In a heterogeneous network, there are many instances where a coverage area, or region, of one base station (e.g., a pico base station) is wholly contained within a coverage area of another individual, or set, of base stations (e.g., a macro base station).

SUMMARY

Systems and methods are disclosed for autonomously determining overlapping coverage in a cellular communications network. In one embodiment, the cellular communications network is a heterogeneous cellular communications network. In one embodiment, a network node of a cellular communication system obtains information indicative of a perceived coverage of one or more covering cells at wireless devices within a measuring cell over a measurement interval. The network node determines overlapping coverage of the measuring cell and the one or more covering cells based on the information indicative of the perceived coverage. In one embodiment, the information indicative of the perceived coverage includes pilot reports generated by wireless devices for the one or more covering cells over the measurement interval, and the network node determines the overlapping coverage based on the pilot reports.

In one embodiment, the network node also obtains information that is indicative of positions of the wireless devices within the measuring cell over the measurement interval. In one embodiment, the information indicative of the positions of the wireless devices includes any one or any combination of two or more of a group consisting of: Channel Quality Index (CQI) values generated by the wireless devices for the measuring cell, Received Strength of Signal Indication (RSSI) measurements reported by the wireless devices with respect to the measuring cell, RSSI measurements made by a base station serving the measuring cell with respect to the wireless devices, Signal-to-Interference-plus-Noise Ratio (SINR) measurements made by the base station serving the measuring cell with respect to the wireless devices, ranging information for the wireless devices with respect to the measuring cell, beamforming indices for the wireless devices with respect to the measuring cell, and ancillary position information for the wireless devices (e.g., Global Positioning System (GPS) locations of the wireless devices provided through a location management server/entity of the cellular communications network).

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 6 is a table summarizing data collected for the measuring cell of FIG. 5 and based on which overlapping coverage for the measuring cell and the four covering cells is determined according to one embodiment of the present disclosure;

FIG. 16 is a block diagram of one example of a wireless device;

FIG. 17 is a block diagram of one example of a radio network node; and

DETAILED DESCRIPTION

Figure 1:
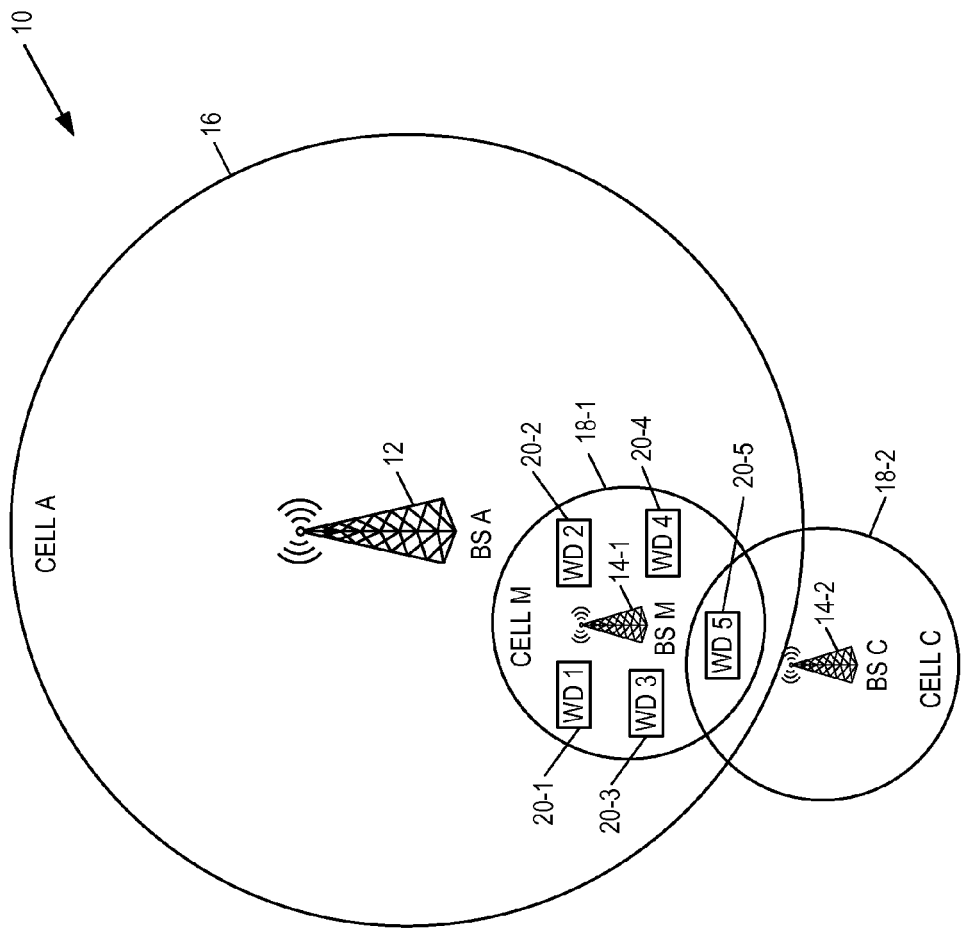
FIG. 1 illustrates a heterogeneous cellular telecommunication network in which overlapping coverage for a measuring cell and a number of covering cells is determined according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Before describing embodiments of the present disclosure, a number of terms that are used throughout this disclosure are provided.

Radio node: As used herein, a "radio node" is characterized by its ability to transmit and/or receive radio signals. A radio node includes at least a transmitting or receiving antenna. A radio node may be a wireless device or a radio network node, both of which are defined below.

Radio network node: As used herein, the non-limiting term "radio network node" is used to refer to any type of network node serving a wireless device (e.g., a User Equipment device (UE)) and/or connected to other network node(s) or network element(s). Examples of radio network nodes include a base station (BS), multi-standard radio (MSR) radio node such as MSR BS, node B, enhanced Node B (eNB), network controller, radio network controller, base station controller, relay, donor node controlling relay, base transceiver station (BTS), access point (AP), etc.

Network node: As used herein, the non-limiting term "network node" is also used to refer to any type of radio network node or any network node, which communicates with at least a radio network node. Such nodes may not themselves necessarily be capable of wireless communication. Examples of network nodes are any radio network node stated above, core network node (e.g. Mobile Switching Center (MSC), Mobility Management Entity (MME), etc.), Operations and Maintenance (O&M), Object Storage Server (OSS), Self Organizing Network (SON), positioning node (e.g., Evolved Serving Mobile Location Center (E-SMLC)), Mobile Data Terminal (MDT), etc.

UE or Wireless Device: The terms "wireless device" (WD) and "user equipment" (UE) are used interchangeably in this description. As used herein, non-limiting term wireless device is used to refer to any type of wireless device capable of communicating with a radio network node in a cellular or mobile communication system. Examples of a wireless device are Personal Digital Assistant (PDA), iPad, tablet, mobile terminals, smart phone, laptop embedded equipment (LEE), laptop mounted equipment (LME), Universal Serial Bus (USB) dongles, etc.

As used herein, a received "signal" may be one or more of: a physical signal, a reference signal, a physical channel, a logical channel, etc.

The signaling described herein may be via direct links or via logical links (e.g. via higher layer protocols and/or via one or more network and/or radio nodes or other indirect links. For example, signaling from a coordinating node to a UE may also pass another network node, e.g., a radio network node.

Further, while Long Term Evolution (LTE) terminology is sometimes used in the description below, the described embodiments are not limited to LTE, but may be applied with any Radio Access Network (RAN), single- or multi-Radio Access Technology (RAT). Some other RAT examples are LTE-Advanced, Universal Mobile Telecommunications System (UMTS), High Speed Packet Access (HSPA), Global System for Mobile Communications (GSM), Code Division Multiple Access 2000 (CDMA2000), WiMAX, and WiFi. Still further, the embodiments described herein may also be applied to multi-point transmission and/or reception systems, carrier aggregation systems, and multi-point carrier aggregation systems.

In $3^{rd}$ Generation Partnership Project (3GPP) LTE, base stations possess an "awareness" of other base stations in their general vicinity. This information can be configured by the operator on each base station, or can be determined autonomously. Each base station has the ability to interrogate wireless devices and collect information on the other base stations that each wireless device "hears." In this way, each base station can build of a list of neighboring cells which it can then use to facilitate Hand-Over (HO) operations and construction of inter-base station backhaul connectivity (e.g., X2 in LTE).

Here it is important to distinguish between the concept of a neighboring cell and overlapping coverage. Neighboring implies that, in some radio sense, cells are adjacent. On the other hand, cell overlap is concerned with duplicate coverage. A list of neighboring cells does not determine overlapping coverage of the neighboring cells.

Presently in heterogeneous networks, overlapping coverage may be assessed as part of a deployment strategy. However, there is no conventional method to: (i) autonomously verify assumptions about overlapping coverage, (ii) continuously and autonomously update the coverage view in anticipation of changes to the radio environment through the addition of new base stations or, e.g., construction projects, or (iii) create a communication and tracking structure within the network to allow the sharing and exploitation of coverage knowledge by elements within the network for future benefits. If overlapping coverage could be determined autonomously, then this determination may be exploited to "turn off" redundant resources when they are not needed. Examples of exploiting coverage overlap include reduction of paging load on small cells and include energy conservation by placing "redundant" base stations in sleep mode during periods of low capacity demand.

In this regard, systems and methods are disclosed for autonomously determining overlapping coverage in a cellular communications network and, in particular, a heterogeneous cellular communications network. In some embodiments, a measurement and measurement event may be utilized to collect pilot information from wireless devices at, e.g., thresholds and time intervals that are different from those of interest for establishing neighbor lists. However, the embodiments disclosed here are not limited to any type of measurement or measurement event.

FIG. 1 illustrates a cellular telecommunication network 10 according to one embodiment of the present disclosure. In this embodiment, the cellular communication network 10 is a heterogeneous network that includes a macro, or high power, base station 12 (also referred to herein as BS A) and a number of small, or low power, base stations 14-1 and 14-2 (also referred to herein as BS M and BS C, respectively). In LTE terminology, the macro base station 12 is wide area eNB, and the small base stations 14 are medium range, local area, or home eNBs (e.g., micro, pico, or femto/home eNBs). The macro base station 12 serves a macro cell 16 (also referred to herein as cell A), whereas the small base stations 14-1 and 14-2 serve corresponding small cells 18-1 and 18-2 (also referred to herein as cells M and C, respectively). A number of wireless devices 20-1 through 20-5 (also referred to herein as WD 1 through WD 5) are located within coverage areas of both the macro cell 16 (cell A) and the small cell 18-1 (cell M). The wireless device 20-5 is also in a coverage area of the small cell 18-2 (cell C).

As discussed below in detail, overlapping coverage between the coverage area of the small cell 18-1 (cell M) and the coverage areas of the macro cell 16 (cell A) and the small cell 18-2 (cell C) is autonomously determined based on information obtained from or for the wireless devices 20-1 through 20-5 with respect to the small cell 18-1 (cell M). In this regard, the small cell (18-1) is referred to herein as a measuring cell and, in contrast, the macro cell 16 (cell A) and the small cell 18-2 (cell C) are referred to herein as covering cells. In this particular example, based on the obtained information, the small cell 18-1 (cell M) can be determined to completely overlap with the macro cell 16 (cell A) and partially overlap with the small cell 18-2 (cell C). This determination may be made by the small base station 14-1, by another network node, or a combination thereof.

Once the overlapping determination is made, this information may be communicated to other network nodes and/or exploited by the cellular communications network 10 to perform one or more operations. For example, based on the overlapping coverage in the example of FIG. 1, the small base station 14-1 may determine that the coverage area of the small cell 18-1 (cell M) is redundant with that of the macro cell 16 and, as such, put the small cell 18-1 (cell M) is a sleep state, or mode. In this case, coverage for the wireless devices 20-1 through 20-5 would still be provided by the macro cell 16. Note, however, that the example above is just one example of how the overlapping coverage could be exploited by the cellular communications network 10. Other non-limiting examples are discussed below.

Figure 2:
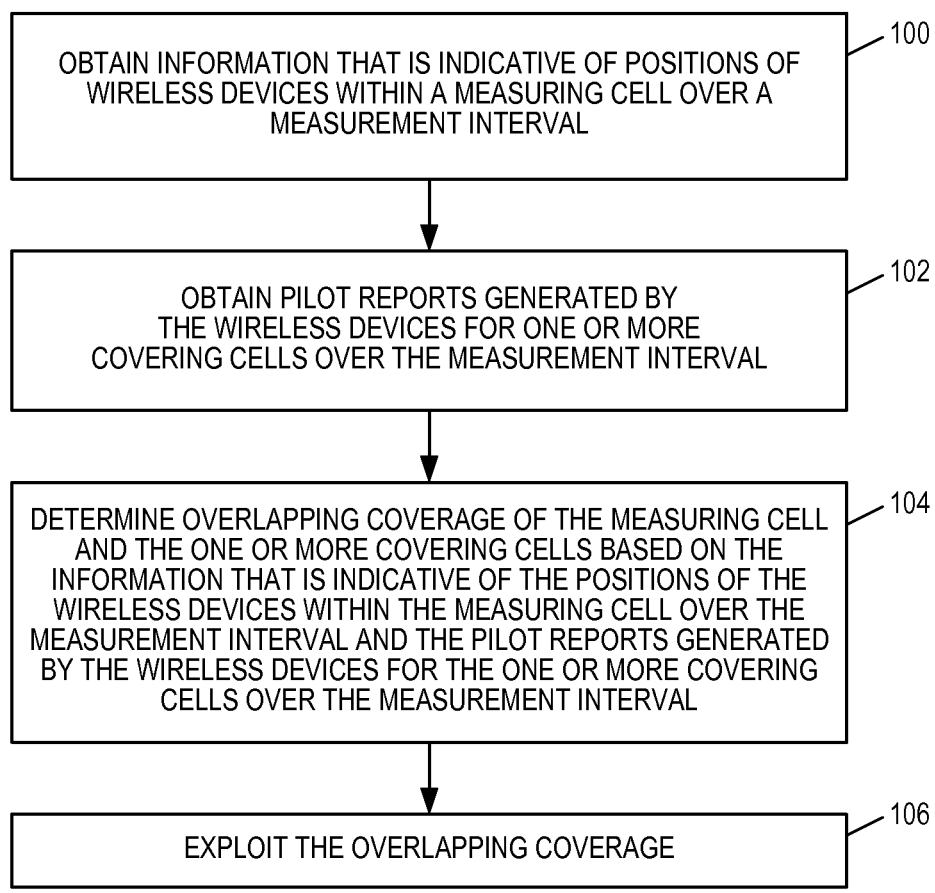
FIG. 2 is a flow chart that illustrates the operation of a network node to determine and exploit the overlapping coverage determined for a measuring cell and one or more covering cells according to one embodiment of the present disclosure.

FIG. 2 is a flow chart that illustrates the operation of a network node to determine and exploit overlapping coverage according to one embodiment of the present disclosure. For ease of discussion, this process is described with respect to the example of FIG. 1. However, this process is not limited thereto. Further, the network node that performs this process may be any suitable network node (e.g., the base station serving the measuring cell). Importantly, while the term "steps" is used herein, the steps illustrated in FIG. 2 and the other figures described herein can be performed in any suitable order unless explicitly stated herein or otherwise implicitly required.

As illustrated, the network node obtains information that is indicative of positions of the wireless devices 20 within the measuring cell (i.e., the small cell 18-2 (cell C)) over a measurement interval (step 100). As discussed below, the information that is indicative of the positions of the wireless devices 20 within the measuring cell (cell M) may be, in some embodiments, Channel Quality Index (CQI) values generated and reported by the wireless devices 20 with respect to the measuring cell. However, the present disclosure is not limited thereto. For example, the information that is indicative of the positions of the wireless devices 20 within the measuring cell (cell M) may be any one or any combination of two or more of a group consisting of: CQI values generated by the wireless devices 20 for the measuring cell (cell M), Received Strength of Signal Indication (RSSI) measurements reported by the wireless devices 20 with respect to the measuring cell (cell M), RSSI measurements made by the base station 14-1 serving the measuring cell (cell M) with respect to the wireless devices 20, Signal-to-Interference-plus-Noise Ratio (SINR) measurements made by the base station 14-1 serving the measuring cell (cell M) with respect to the wireless devices 20, ranging information for the wireless devices 20 with respect to the measuring cell (cell M), beamforming indices for the wireless devices 20 with respect to the measuring cell (cell M), and ancillary position information for the wireless devices (e.g., Global Positioning System (GPS) locations of the wireless devices provided through a location management server/entity of the cellular communications network).

In addition to the information of step 100, the network node obtains pilot reports generated by the wireless devices 20 for one or more covering cells over the measurement interval (step 102). Note that while pilot reports are used in the embodiments described herein, any type of information that is indicative of perceived coverage of the covering cells at the wireless devices 20 in the measuring cell (cell M) may be used. One example of an alternative type of information that may be used as an indication of perceived coverage of the covering cells at the wireless devices 20 is uplink sounding information. For example, the wireless devices 20 may periodically send sounding reference symbols (SRS), or the equivalent, and then the base stations 12-2 and 12-3 of the covering cells determine the hearability of the sounding reference symbols. The base stations 12-2 and 12-3 may then provide the results to the network node. This approach may alternatively use any type of uplink signal.

In this example, the covering cells are or at least include the macro cell 16 (cell A) and the small cell 18-2 (cell C). In the example of FIG. 1, the wireless devices 20-1 through 20-4 generate and send pilot reports for a pilot signal received from the macro cell 16, and the wireless device 20-5 generates and sends a first pilot report for a pilot signal received from the macro cell 16 (cell A) and a second pilot report for a pilot signal received from the small cell 18-2 (cell C). In one embodiment, the pilot reports include received signal strength values for corresponding covering cells. However, in another embodiment, the wireless devices 20 are configured to generate and send the pilot reports only when the received pilot strength for the corresponding covering cells is greater than a threshold(s) used for determining overlapping coverage. The threshold(s) used for determining overlapping coverage may be the same for all covering cells or different (e.g., independently configurable) for different covering cells. In this way, each pilot report implicitly indicates a received pilot signal strength greater than the threshold.

The network node then determines overlapping coverage of the measuring cell (cell M) and the one or more covering cells (cell A and cell C) based on the information that is indicative of the positions of the wireless devices 20 within the measuring cell (cell M) over the measurement interval and the pilot reports generated by the wireless devices 20 for the one or more covering cells (cell A and cell C) over the measurement interval (step 104). As discussed below in detail, the network node analyzes the information and the pilot reports to determine the overlapping coverage. In the example of FIG. 1, the network node is able to analyze the information and the pilot reports for the wireless devices 20-1 through 20-5 to determine that the coverage area of the measuring cell (cell M) completely overlaps with the coverage area of cell A and partially overlaps with the coverage area of cell C. More specifically, the network node can determine that, regardless of the position of the wireless devices 20 within the measuring cell (cell M), the received strength of the pilot signal from cell A at those wireless devices 20 is greater than a threshold for determining overlapping coverage and, as such, there is complete overlap between the coverage area of the measuring cell (cell M) and that of cell A. In contrast, the network node can determine that only those wireless devices 20 at certain positions (e.g., at certain CQI values) report a received strength of the pilot signal from cell C above a threshold for determining overlapping coverage and, as such, there is only partial overlap between the coverage area of the measuring cell (cell M) and that cell C.

Once the overlapping coverage is determined, the network node exploits the overlapping coverage (step 106). The overlapping coverage may be exploited in any desired manner. As one example, the network node may exploit the overlapping coverage by placing the measuring cell (cell M) in a sleep state during a period(s) of low demand because there is complete overlap between the measuring cell (cell M) and cell A. In addition or alternatively, the network node may provide information regarding the overlapping coverage to other network node(s) (e.g., the macro base station 12, the small base station 14-1 (if not the network node), and/or the small station 14-2) for use by those other network node(s) in any desired manner. Additional examples of exploiting the overlapping coverage information include reduction of paging load on small cells (e.g., the macro cell 16 may perform paging for the small cell 14-1). However, the present disclosure is not limited to the examples above. The overlapping coverage information may be exploited, or used, in any desired manner.

Note that step 100 is optional. In other words, in some alternative embodiments, the information indicative of the positions of the wireless devices 20 within the measuring cell (cell M) may not be obtained and used to determine the overlapping coverage of the measuring cell (cell M) and the covering cells. This is also true to the other embodiments described below.

Figure 3:
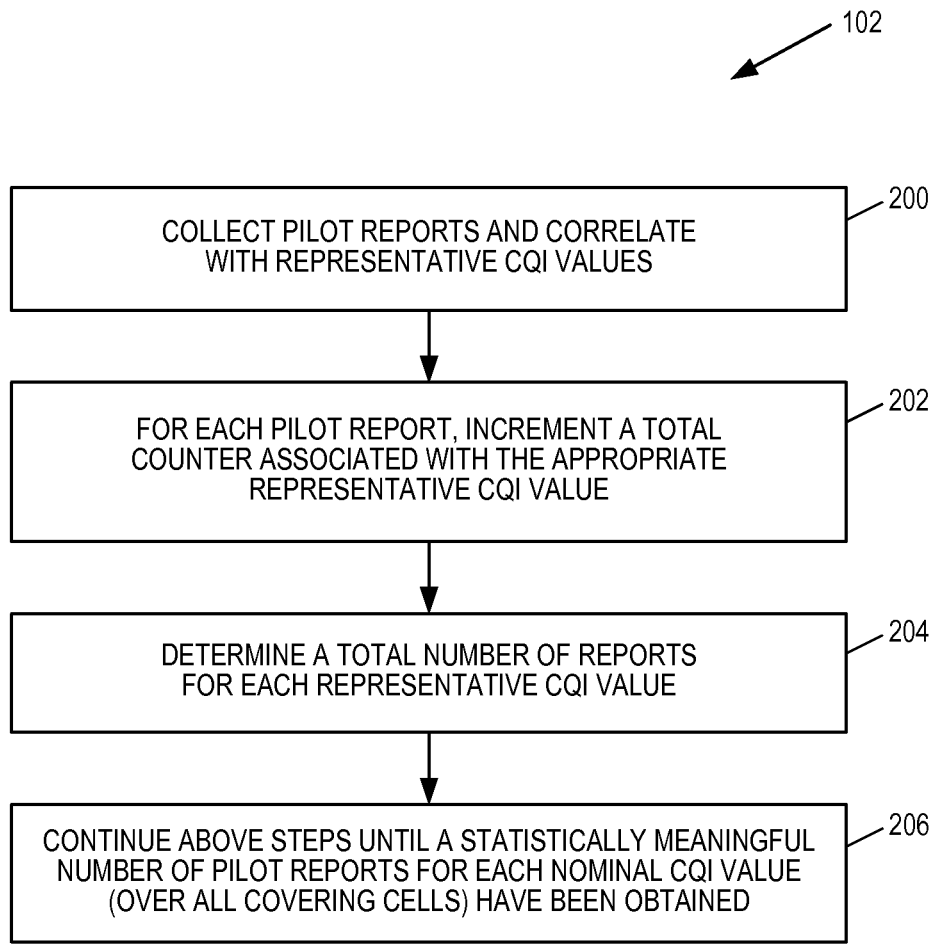
FIG. 3 is a flow chart that illustrates the operation of a network node to collect and process pilot reports according to one embodiment of the present disclosure.

FIG. 3 illustrates the operation of a network node to obtain the pilot reports from the wireless devices 20 as discussed above with respect to step 102 of FIG. 2 according to one embodiment of the present disclosure. Notably, in this example, while obtaining the pilot reports, the network node correlates the pilot reports to ranges of values for the position information obtained in step 100 of FIG. 2. Further, in this example, the information indicative of the positions of the wireless devices 20 is CQI values reported by the wireless devices 20 with respect to the measuring cell (cell M). However, this process is not limited thereto.

As illustrated, the network node collects pilot reports and correlates the pilot reports to corresponding representative CQI values (step 200). Note that the term "CQI" is used in 3GPP LTE standards. However, it is to be understood that any indication of channel quality can be used. As used herein, a representative CQI value is a CQI value that is representative of a range of average CQI values. In other words, in LTE, the representative CQI values may be 1, 2, 3, . . . , 15. Based on the CQI values reported from a particular wireless device 20 over the measurement interval, a corresponding representative CQI value for that wireless device 20 is determined. Then, the pilot report(s) received from that wireless device 20 during the measurement interval are correlated to the corresponding representative CQI value.

Using the wireless device 20-1 as an example, in one embodiment, a representative CQI value for the wireless device 20-1 over the measurement interval is determined based on the CQI values reported by the wireless device 20-1 for the measuring cell (cell M) during the measurement interval. In 3GPP LTE, the possible CQI values are the integer values in the range of and including 1 to 15. As used herein, a "representative" CQI value is one of the 15 possible CQI values that represents a range of CQI values. In one particular embodiment, a representative CQI value is one of the 15 possible CQI values that represents a range of average values in which the average of the CQI values reported by the wireless device 20 falls. So, if the wireless device 20-1 reports CQI values of 1, 2, 1, 1, 2 during the measurement interval, the average CQI value for the wireless device 20 is 1.4, which may correspond to a representative CQI value of 1. Then, the pilot reports generated and reported by the wireless device 20-1 during the same measurement interval are correlated to, or associated with, the representative CQI value of 1.

Notably, the use of representative CQI values is only an example. As another example, ranges of average CQI values may be used in lieu of the representative CQI values. The ranges of average CQI values may be, for example, 1-1.5, 1.5-2.5, 2.5-3.5, etc. or, as another example, 1-3, 3-5, 5-7, etc. In the same manner, if some additional or alternative information (or combination of information) indicative of the positions of the wireless devices 20 within the measuring cell (cell M) is used, similar ranges of values may be used to enable correlation of the pilot reports with appropriate ranges or "bins." For instance, other measures may be formulated to represent the quality of the downlink signal from the measuring cell (cell M) at the wireless devices 20 so as to assess the positions of the wireless devices 20 in Radio Frequency (RF) space (i.e., positions in the RF sense).

The network node determines a total number of reports for each representative CQI value (step 202). More specifically, the "total number of reports" for a particular representative CQI value X and a particular covering cell Y is equal to the sum of: (1) a number of pilot reports received for covering cell Y that are correlated to the representative CQI value X (and report a received pilot signal strength for covering cell Y that is greater than the threshold for covering cell Y) and (2) a number of wireless devices 20 connected to the measuring cell (cell M) at the representative CQI value X that did not send a pilot report for covering cell Y. Further, for each pilot report that reports a pilot strength greater than the threshold for the corresponding covering cell, the network node increments a threshold counter associated with the appropriate covering cell and representative CQI value combination (step 204). The network node continues, or repeats, steps 200-204 until the total number of reports for each representative CQI value and covering cell combination reaches a statistically meaningful number (step 206).

Notably, in the process of FIG. 3, all pilot reports may be processed. However, in another embodiment, only "unique" pilot reports are processed. This may be desirable to ensure that each pilot report counted provides meaningful information. For example, if a wireless device 20 is stationary and continuously reporting approximately the same information, it may not be desirable to increment the counters for each report. Thus, in one embodiment, a condition is placed on whether to count a pilot report from the wireless device 20 as well as use an averaging window. For example, multiple reports received from a wireless device 20 (that is not moving quickly) within a specified time window may be grouped together and averaged in some way to form one report. Subsequent reports from the same wireless device 20 will only count as a new measurement if there is a good indication that the wireless device 20 has moved. Such an indication would be, for example, a significant change in reported CQI, measured range, or other location information.

Figure 4:
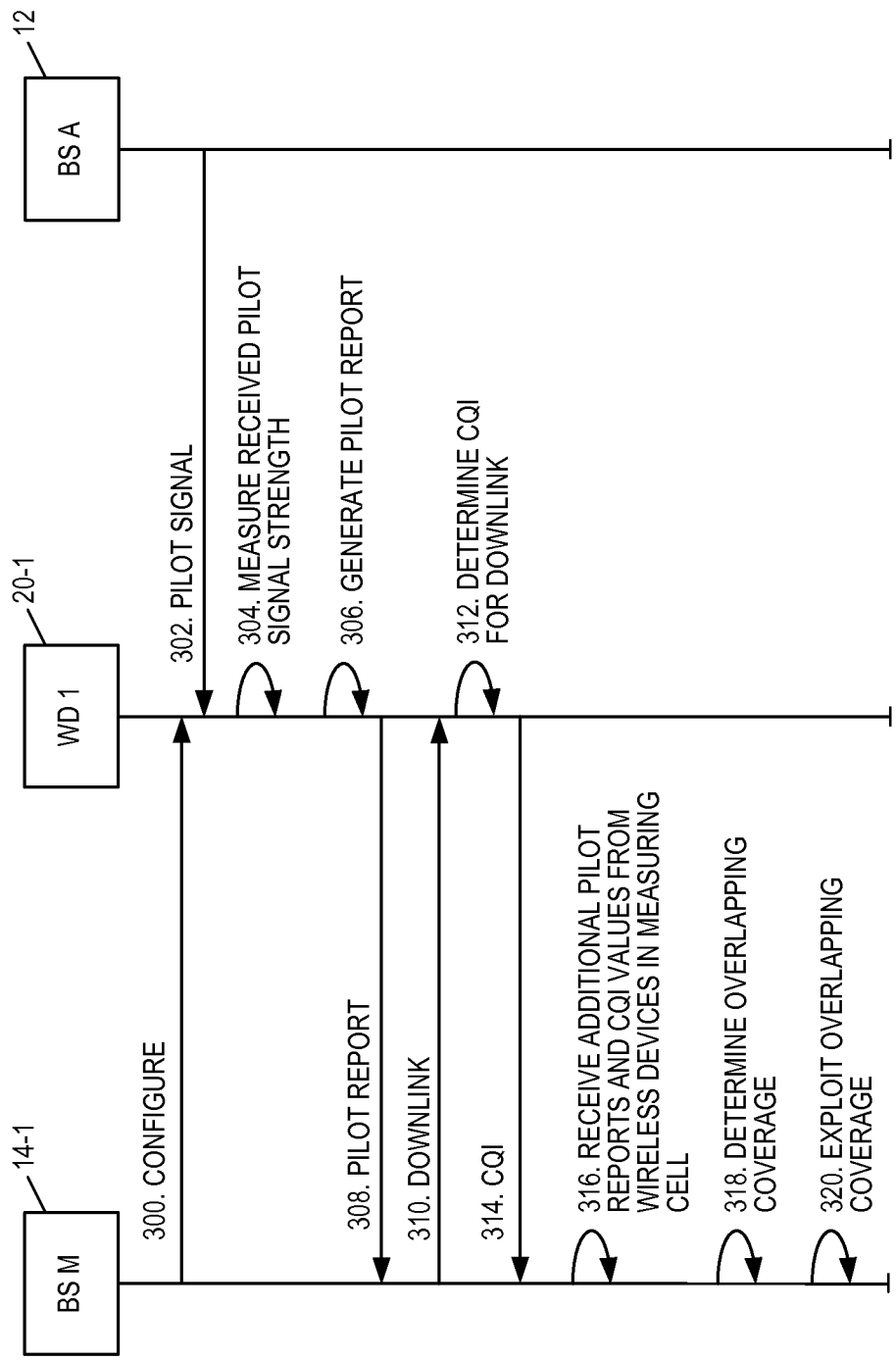
FIG. 4 illustrates the operation of the cellular communications network of FIG. 1 according to one embodiment of the present disclosure.

FIG. 4 illustrates the operation of the cellular communications network 10 of FIG. 1 according to one embodiment of the present disclosure. In this example, the small base station 14-1 (which may also be referred to as the measuring base station BS M) configures the wireless device 20-1 (step 300). More specifically, the small base station 14-1 configures the wireless device 20-1 to generate and send pilot reports for detected covering cells. The configuration may define, e.g., a unique measurement event and event properties in order to collect pilot reports for determining overlapping coverage. For example, the configuration may include a received pilot strength threshold that must be met before generating and sending a pilot report. In one embodiment, this threshold is different than (e.g., lower than) the threshold(s) used for determining overlapping coverage. However, in another embodiment, the wireless device 20-1 may be configured with the threshold(s) used for determining overlapping coverage such that the wireless device 20-1 generates and sends the pilot reports upon detecting a pilot signal from a covering cell having a received strength that is greater than the threshold for that covering cell, where the threshold for the covering cell may be the same or different than the thresholds for other covering cells. In the same manner, the small base station 14-1 configures the other wireless devices 20-2 through 20-5 (not shown).

Sometime thereafter, the macro base station 12 (BS A) transmits a pilot signal for the macro cell 16 (cell A) (step 302). The wireless device 20-1 receives the pilot signal and measures a received signal strength for the pilot signal for the macro cell (cell A) (step 304). The wireless device 20-1 then generates and sends a pilot report for the macro cell 16 (cell A) to the small base station 14-1 (BS M) (steps 306 and 308). As discussed above, in one embodiment, the wireless device 20-1 generates and sends the pilot report only if the received signal strength is greater than some minimum threshold, which may be configurable by the cellular communications network 10 (e.g., in the configuration of step 300). Further, in one embodiment, this minimum threshold is different than (e.g., less than) the threshold used for determining overlapping coverage. However, in another embodiment, the minimum threshold is the same as the threshold used for determining overlapping coverage. The pilot report generated and sent in steps 306 and 308 includes, in one embodiment, information that identifies the macro cell 16 (cell A) (e.g., a cell Identifier (ID)). Further, in some embodiments, the pilot report includes the received signal strength of the pilot signal transmitted by the macro base station 12 for the macro cell 16 (cell A).

The wireless device 20-1 also receives a downlink from the small base station 14-1 for the small cell 18-1 (cell M) and determines a CQI value for the downlink channel (steps 310 and 312). The CQI value can be determined using any suitable technique. Further, many suitable techniques for determining the CQI values are known to those of ordinary skill in the art. After determining the CQI value, the wireless device 20-1 reports the CQI value to the small base station 14-1 (BS M) (step 314). In the same manner, the small base station 14-1 (BS M) receives pilot reports and CQI values from the wireless devices 20 in the small cell 18-1 (cell M) for all covering cells (e.g., cell A and cell C) (step 316). As discussed above, the small base station 14-1 (BS M) determines overlapping coverage based on the collected pilot reports and CQI values and exploits the overlapping coverage, as discussed above (steps 318 and 320).

Figure 5:
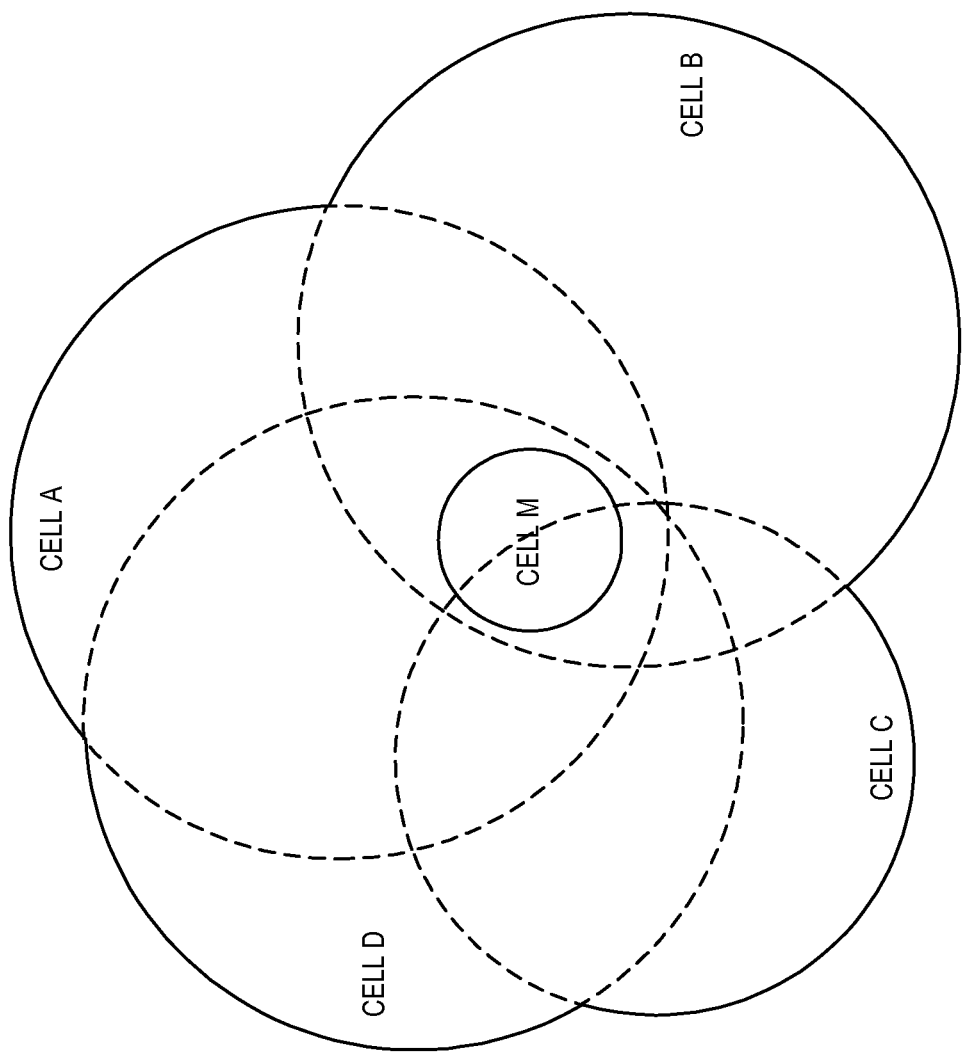
FIG. 5 illustrates one example of a cellular telecommunication network including a measuring cell and four covering cells according to one embodiment of the present disclosure.

FIGS. 5 and 6 illustrate the determination of overlapping coverage in more detail according to one embodiment of the present disclosure. As illustrated in FIG. 5, in this example, the coverage area of the measuring cell (cell M) is overlapped by coverage areas of a number of covering cells (cells A, B, C, and D). The measuring cell (cell M) is fully overlapped by each of three covering cells (cell A, cell B, and cell D), and is partially overlapped by one covering cell (cell C).

As discussed above, a network node (e.g., a base station serving the measuring cell M) obtains pilot reports generated by wireless devices in the measuring cell M for each of the covering cells and correlates the pilot reports to, in this example, representative CQI values. Using this correlated data, the network node determines the overlapping coverage of the measuring cell M with the covering cells A, B, C, and D. More specifically, FIG. 6 is a table that illustrates one manner in which the pilot reports and CQI values from the wireless devices in the measuring cell M may be processed to determine overlapping coverage. In the table of FIG. 6, row 400 provides the representative CQI values starting with a representative CQI value of 1 in column 2 and ending with a representative CQI value of 15 in row 16. Row 402 provides target values defining a minimum statistically relevant number of sampled pilot reports for each representative CQI value. These values are N1 for representative CQI=1, N2 for representative CQI=2, ..., N13 for representative CQI=13, N14 for representative CQI=14, and N15 for representative CQI=15. These target values need to be "statistically" significant for the assessment to have validity. However, because the number of wireless devices experiencing very low or very high CQI values may be small, the per CQI thresholds (N1, N2, etc.) can be used to weight the decision within a minimum and maximum range which is based on the total number of unique measurement attempts.

Row 404 includes percentages of pilot reports for each representative CQI value for covering cell A reporting received pilot signal strengths for covering cell A that are greater than a threshold T1 for covering cell A. In this example, 100% of the pilot reports received from wireless devices in the measuring cell M that are correlated to the representative CQI value of 1 reported a received signal strength for covering cell A greater than the threshold T1. Similarly, 100% of the pilot reports received from wireless devices in the measuring cell M that are correlated to each of the representative CQI values of 2, 3, ..., 15 reported a received signal strength greater than the threshold T1 for covering cell A.

Row 406 includes percentages of pilot reports for each representative CQI value reporting received pilot signal strengths for covering cell B that are greater than a threshold T1 for covering cell B. In this example, 85% of the pilot reports received from wireless devices in the measuring cell M that are correlated to the representative CQI value of 1 reported a received signal strength greater than the threshold T1 for covering cell B. Similarly, 95% of the pilot reports received from wireless devices in the measuring cell M that are correlated to the representative CQI value of 2 reported a received signal strength greater than the threshold T1 for the covering cell B. However, 100% of the pilot reports received from wireless devices in the measuring cell M that are correlated to each of the representative CQI values of 3, 4, ..., 15 reported a received signal strength greater than the threshold T1 for covering cell B.

Row 408 includes percentages of pilot reports for each representative CQI value reporting received pilot signal strengths for covering cell C that are greater than a threshold T1 for covering cell C. In this example, 25% of the pilot reports received from wireless devices in the measuring cell M that are correlated to the nominal CQI value of 1 reported a received signal strength greater than the threshold T1 for covering cell C. Similarly, 30% of the pilot reports received from wireless devices in the measuring cell M that are correlated to the representative CQI value of 2 reported a received signal strength greater than the threshold T1 for covering cell C. Only 10% of the pilot reports received from wireless devices in the measuring cell M that are correlated to the nominal CQI value of 13 reported a received signal strength greater than the threshold T1 for covering cell C, and 0% of the pilot reports received from wireless devices in the measuring cell M that are correlated to the nominal CQI values of 14 and 15 reported a received signal strength greater than the threshold T1 for covering cell C.

Row 410 includes percentages of pilot reports for each representative CQI value reporting received pilot signal strengths for covering cell D that are greater than a threshold T1 for covering cell D. In this example, 100% of the pilot reports received from wireless devices in the measuring cell M that are correlated to each of the nominal CQI values of 1 and 2 reported a received signal strength greater than the threshold T1 for covering cell D. However, only 30% of the pilot reports received from wireless devices in the measuring cell M that are correlated to the nominal CQI value of 13 reported a received signal strength greater than the threshold T1 for covering cell D, and only 20% of the pilot reports received from wireless devices in the measuring cell M that are correlated to each of the nominal CQI values of 14 and 15 reported a received signal strength greater than the threshold T1 for covering cell D.

In one embodiment, the percentages shown in the table of FIG. 6 can be computed using the counters provided via the process of FIG. 3. Further, in one embodiment, the percentages shown for each representative CQI value may be computed (or seen as statistically relevant) once the total number of pilot reports received for the that representative CQI value is greater than the corresponding threshold Nx, where "x" is the representative CQI value (i.e., 1, 2, ..., or 15).

From the table of FIG. 6, the network node can autonomously determine the overlapping coverage of the measuring cell M and the covering cells A, B, C, and D. More specifically, based on row 402, the network node determines that there is complete overlapping of the measuring cell M by the covering cell A since 100% of the sampled pilot reports for all of the nominal CQI values have a reported received signal strength greater than the threshold T1 for the covering cell A. From row 406, the network node determines that, while the overlapping coverage may not be perfect, there is complete overlapping of the measured cell M by the covering cell B. Alternatively, the cell edge region of the measuring cell M (where CQI values are generally low), may be considered a "grey" region in terms of the definition of the cell boundary for the measuring cell M. As a result, coverage of this cell edge region by another pilot may not be critical to the definition of overlapping coverage. From row 408, the network node determines that there is only poor, partial overlapping coverage between the measuring cell M and the covering cell C. Lastly, from row 410, the network node determines that there is overlapping coverage between the measuring cell M and the covering cell D in some parts of the coverage area of the measuring cell M but not in other parts of the coverage area of the measuring cell M (i.e., there is partial overlap).

Thus, to summarize, FIG. 6 indicates that the coverage area of the measuring cell fully overlaps the coverage areas of covering cells A, mostly overlaps the coverage area of covering cell B but part of the measuring cell M is very close to the cell edge of the covering cell B, only partially overlaps the coverage area of covering cell C, and partially overlaps the coverage area of cell D. Again, with respect to the covering cell D, while the measuring cell M appears to be fully within the coverage area of covering cell D in the illustration of FIG. 5, there is some showing or other effects that restrict the RF overlap. Note, however, that the union of the coverage of the covering cells B and D provides complete overlap with the coverage area of the measuring cell M.

Before proceeding, it should also be noted that the thresholds T1 used in the table of FIG. 6 may be the same threshold for all of the covering cells A, B, C, and D. Alternatively, at least some of the thresholds are different (e.g., the thresholds T1 for the covering cells A, B, C, and D may be independently configurable). Further, while the same threshold(s) are used for all of the representative CQI values in the example of FIG. 6, in another embodiment, different thresholds may be used for at least some of the nominal CQI values. Thus, in one example, thresholds for the different covering cell and nominal CQI value combinations may be independently configurable.

Also, while the pilot reports are correlated to the representative CQI values in the example of FIG. 6, the pilot reports may be correlated to ranges of CQI values or ranges of representative CQI values (e.g., the table may include a first column for a CQI value range of 1-3, a second column for a CQI range of 3-5, a third CQI range of 5-7, etc.). Further, while CQI value are used in the example of FIG. 6, any information or combination of information that is indicative of the positions of the wireless devices within the measuring cell M when detecting and measuring the pilot signals for the pilot reports may be used, as discussed above.

Figure 7:
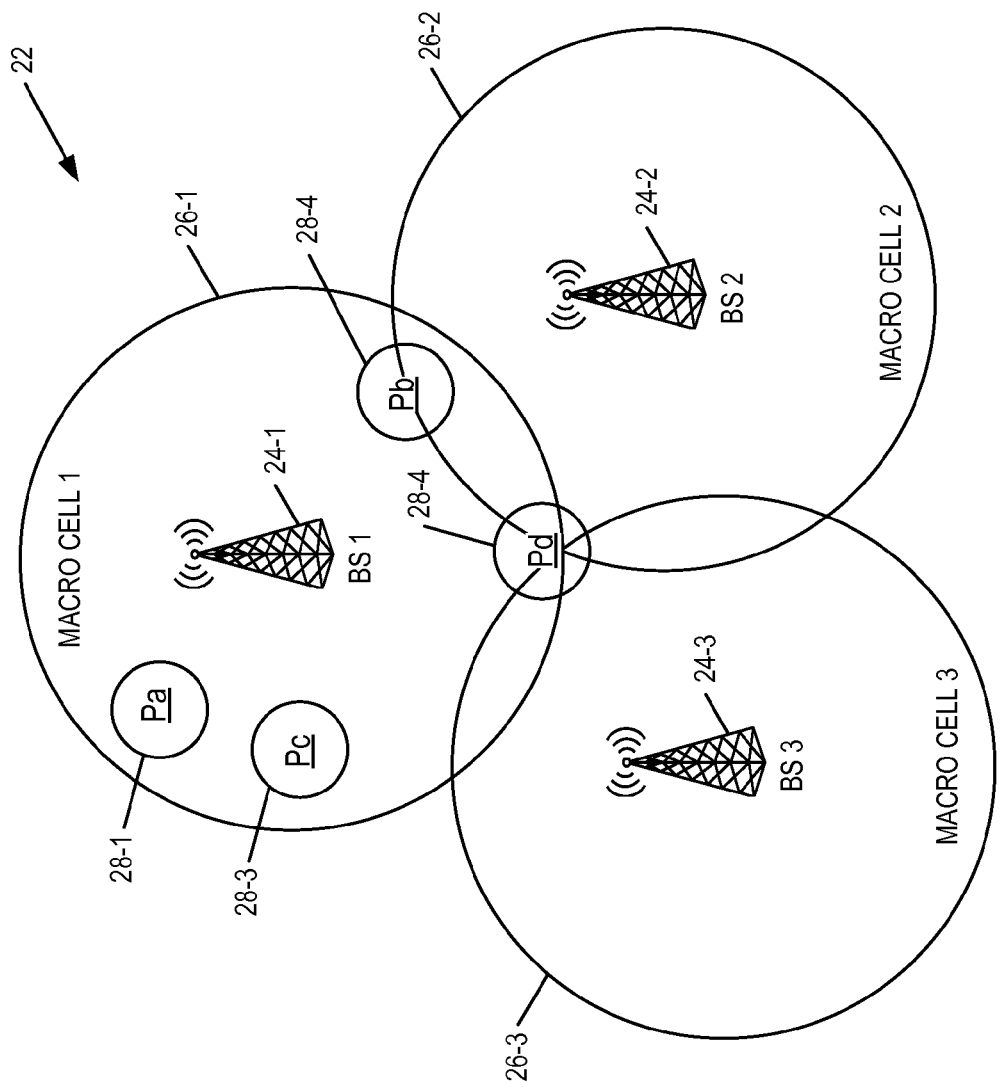
FIG. 7 illustrates a heterogeneous cellular communications network according to another example of the present disclosure.

FIG. 7 illustrates a heterogeneous cellular communications network 22 including three macro base stations 24-1 through 24-3 serving corresponding macro cells 26-1 through 26-3 and four pico base stations (not shown) serving corresponding pico cells 28-1 through 28-4 according to one example embodiment of the present disclosure. The embodiments described herein for determining overlapping coverage can be utilized with respect to each of the pico cells 28-1 through 28-4 to determine the overlapping coverage between the pico cells 28-1 through 28-4 and the macro cells 26-1 through 26-3. In this regard, the pico cell 28-1 (Pa) is determined to be fully overlapped by the macro cell 26-1. Pico cell 28-2 (Pb) is determined to be fully overlapped by the macro cell 26-1 and partially overlapped by the macro cell 26-2. Pico cell 28-3 (Pc) addresses e.g., a coverage hole in the macro cell 26-1, and is not overlapped by any other macro cell or pico cell. Pico cell 28-4 (Pd) is determined to be partially overlapped by macro cell 26-1, partially overlapped by macro cell 28-2, and partially overlapped by macro cell 28-3. Combined (or collectively), the macro cells 28-1, 28-2, and 28-3 are determined to provide full overlapping coverage of the pico cell 28-4 (Pd).

In one example, for each of the pico cells 28, the overlapping coverage may be represented using set notation, as shown below:

<measuring eNB ID>{coverage set} where:

{coverage set}={$eNB_1(x1)$, $eNB_2(x2)$, $eNB_3$ U $eNB_4$, $eNB_5$, ... }.

This notation indicates the following: the covering cell served by $eNB_1$ provides x1% of overlapping coverage, the covering cell served by $eNB_2$ provides x2% of overlapping coverage, the covering cell served by $eNB_3$ and $eNB_4$ together provide full overlapping coverage, and the covering cell served by $eNB_5$ on its own provides full overlapping coverage. Indication of partial coverage may not be useful, but is included here for completeness, as shown in the following examples:

Node1{na} indicates that the measuring cell served by Node1 is 100% covered by the covering cell served by node a (na).

Node1 {na U nb, nc} indicates that the measuring cell served by Node 1 is 100% covered by the aggregate (union) coverage of the covering cells served by na and nb. Also, the measuring cell served by Node1 is completely covered by the covering cell served by nc.

Node1 {na(x %)} indicates that the measuring cell served by node 1 is covered by the covering cell served by node na up to x %.

Figure 8:
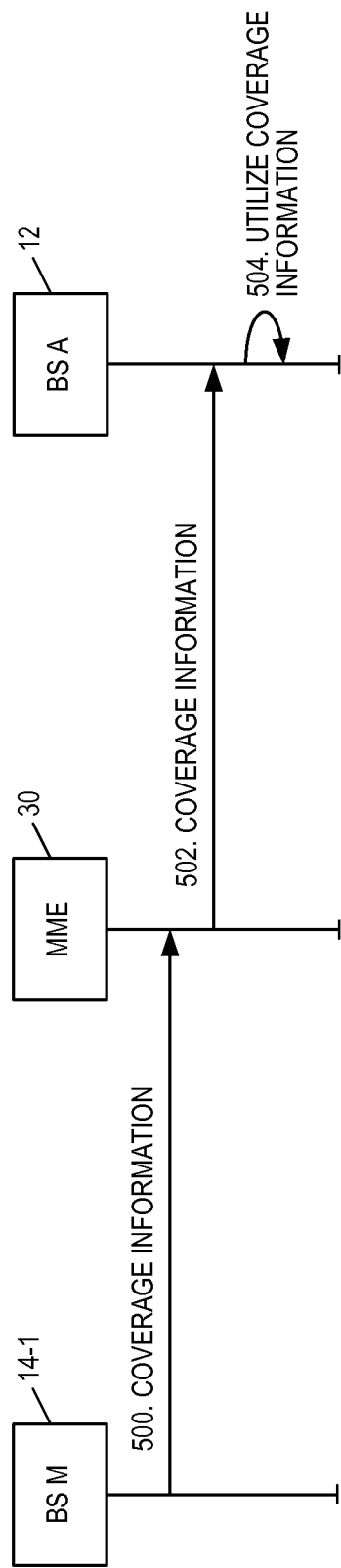
FIG. 8 illustrates the communication of information regarding overlapping coverage of a measuring cell from one network node to another according to one embodiment of the present disclosure.
Figure 9:
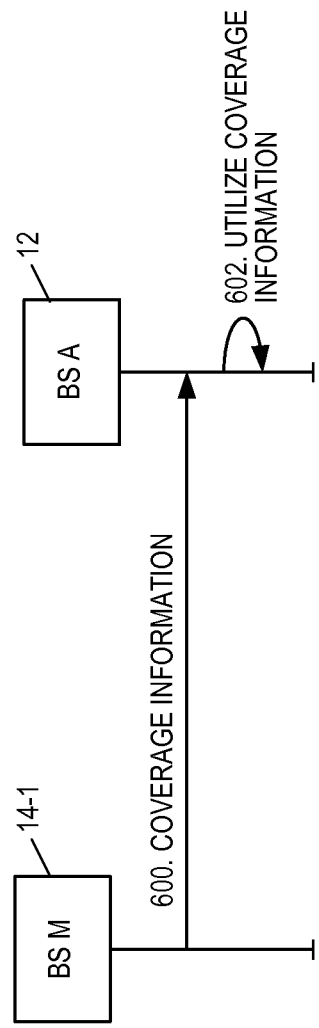
FIG. 9 illustrates the communication of information regarding overlapping coverage of a measuring cell from one network node to another according to another embodiment of the present disclosure.

As discussed above, in some embodiments, information regarding the overlapping coverage may be communicated to other network nodes in the cellular communication network 10. In this regard, FIGS. 8 and 9 illustrate two examples in which the small base station 14-1 provides information regarding the overlapping coverage to another network node, namely, the macro base station 12. More specifically, as illustrated in FIG. 8, after determining the overlapping coverage as described above, the small base station 14-1 provides information regarding the overlapping coverage to a MME 30 of the cellular communications network 10 (step 500). In LTE, communication with the MME 30 may be via an S1 interface. Note that the MME 30 is only an example. The MME 30 then sends the information regarding the overlapping coverage to the macro base station 12 (step 502). The macro base station 12 may then utilize the information regarding the overlapping coverage of the small cell 18-1 (step 504). The macro base station 12 may utilize the information to perform any suitable action. While not illustrated, the MME 30 may receive and utilize the information regarding overlapping coverage of the small cell 14-1 and, in some embodiments, information regarding overlapping coverage of one or more additional cells. For example, based on such overlapping coverage information from multiple cells, the MME may, e.g., command one or more base stations to place cells (e.g., fully overlapped cells) into a sleep mode.

FIG. 9 illustrates an embodiment similar to that of FIG. 8 but where the small base station 14-1 sends the information regarding the overlapping coverage of the small cell 18-1 directly to the macro base station 12 (e.g., via X2). More specifically, after determining the overlapping coverage as described above, the small base station 14-1 provides information regarding the overlapping coverage to the macro base station 12 (step 600). The macro base station 12 may then utilize the information regarding the overlapping coverage of the small cell 18-1, as discussed above (step 602).

Note that, in some embodiments, the overlapping coverage evaluation is static. However, in other embodiments, the overlapping coverage evaluation is not static. For example, the overlapping coverage evaluation may be periodically reassessed over time, possibly using a fading memory filter. Such periodic or continuous testing will capture any time dependent long term variations due to changes that might affect RF conditions (e.g., new buildings, changes to antenna positioning, new covering cells, changes in foliage growth, etc.).

Figure 10:
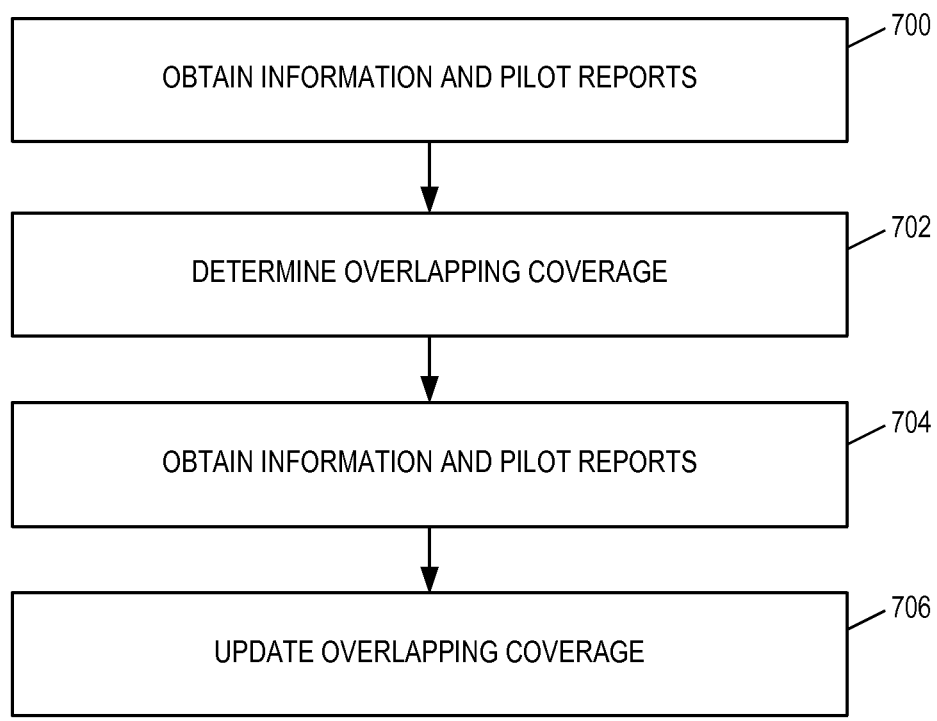
FIG. 10 is a flow chart that illustrates a process by which a network node updates the overlapping coverage of a measuring cell over time according to one embodiment of the present disclosure.

In this regard, FIG. 10 is a flow chart that illustrates the operation of a network node to determine overlapping coverage for a measuring cell and subsequently update the determination of overlapping coverage according to one embodiment of the present disclosure. In this embodiment, the overlapping coverage representation, or information, is updated using a fading memory filter scheme. However, the present disclosure is not limited thereto. For ease of discussion, the process of FIG. 10 is described with respect to the example of FIG. 1. However, the process is not limited thereto.

First, as illustrated, the network node obtains the information that is indicative of the positions of the wireless devices 20 in the measuring cell (cell M) and the pilot reports from the wireless devices 20, as described above (step 700). The network node then determines the overlapping coverage for the measuring cell (cell M). Sometime thereafter, the network node obtains new information that is indicative of the positions of the same and/or different wireless devices in the measuring cell (cell M) and pilot reports from those wireless devices (step 704). The network node then updates the overlapping coverage representation (i.e., the determined overlapping coverage) of the measuring cell (cell M) (step 706). In one embodiment, the overlapping coverage representation of the measuring cell (cell M) is updated according to an update scheme (e.g., a fading memory filter scheme) that gradually changes the overlapping coverage representation over time.

When the measuring cell (cell M) has overlapping coverage from a covering cell served by a base station that uses a different RAT, or different carrier, there is no interference between the carriers of the two cells. As well, in a multi-carrier system, even if the overlapping cells use the same two (or more) carriers, the cells may exploit the carrier diversity to obtain (nearly) interference free measurements of the pilot signals of the covering cells.

A possible signal interference challenge can occur in single frequency systems when measuring the pilot signals of the covering cells across the full extent of the cell. The signal of the measuring cell will be very strong close to the antenna of the base station serving the measuring cell, possibly making it difficult for a wireless device to measure other pilots or even synchronize to the signals from other cells when the wireless device is close to the base station of the serving cell. In this case, one or more of the following approaches may be utilized to address this issue:

Use different frequency offsets between the pilots of the covering and measuring base stations. This can be accomplished through, e.g., proper cell ID planning.

To further improve pilot detectability, a quiet period in the downlink of the measuring base station may be used to reduce, but not necessarily eliminate, traffic in the downlink to assist wireless devices in measuring the pilot signals of the covering cell(s) (i.e., the wireless devices, particularly those near the antenna of the base station serving the measuring cell, can be measuring the pilot signals of the covering cell(s) during the quiet periods).

Improved receiver sensitivity at the wireless devices. There are a variety of techniques available for use when detecting pilots where the signal structure is known a priori. Such methods include using successive interference cancellation (SIC), and/or use of long integration times, etc.

The base station serving the measuring cell can gradually wilt its signal and monitor the wireless devices connected to the measuring cell as they hand-over to other cells or remain on the measuring cell but become able hear and report on the pilot signals from covering cells. Such an operation will have a local temporal and spatial impact on capacity. But since these measurement activities will occur only briefly and infrequently, the overall impact of the wilting process on network capacity will be negligible.

Covering cells can use a reference signal power boost for pilot signals.

Reduce the bandwidth of the radiated signal transmitted for the measuring cell. This change will provide more "clear space" where the wireless devices in the measuring cell will be better able to hear the pilot signals from the covering cells.

Use empty Evolved Multimedia Broadcast Multicast Service (eMBMS) subframes to provide more symbols in which there is no pilot interference from the measuring cell.

Figure 11:
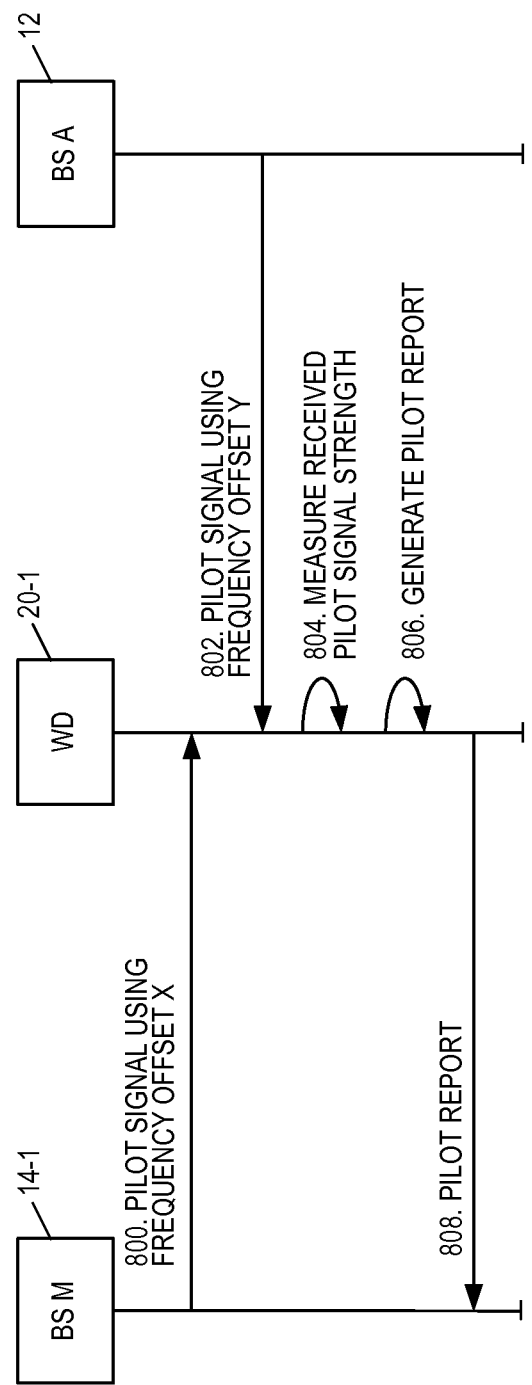
FIG. 11 illustrates a process by which pilot signal measurement is improved by utilizing different frequency offsets for transmission of pilot signals for the measuring and covering cells according to one embodiment of the present disclosure.

FIGS. 11-15 illustrate examples of some of the approaches above. More specifically, FIG. 11 illustrates an embodiment in which a measuring cell and a covering cell utilize different frequency offsets for their pilot signals according to one embodiment of the present disclosure. Again, for ease of discussion, the example of FIG. 1 is used. As illustrated, the small base station 14-1 serving the measuring cell (cell M) transmits its pilot signal using a first frequency offset X, whereas the macro base station 12 serving the covering cell (cell A) transmits its pilot signal using a frequency offset Y (steps 800 and 802). The wireless device 20-1 then receives and measures the pilot signal from the covering cell (cell A) (step 804). Because the pilot signal from the covering cell (cell A) uses a different frequency offset than the pilot signal from the measuring cell (cell M), measurement of the pilot signal from the covering cell (cell A) at the wireless device 20-1 is assisted, particularly when the wireless device 20-1 is near the antenna of the small base station 14-1. The wireless device 20-1 then generates and sends a pilot report for the covering cell (cell A) to the small base station 14-1, as discussed above (step 806 and 808).

Figure 12:
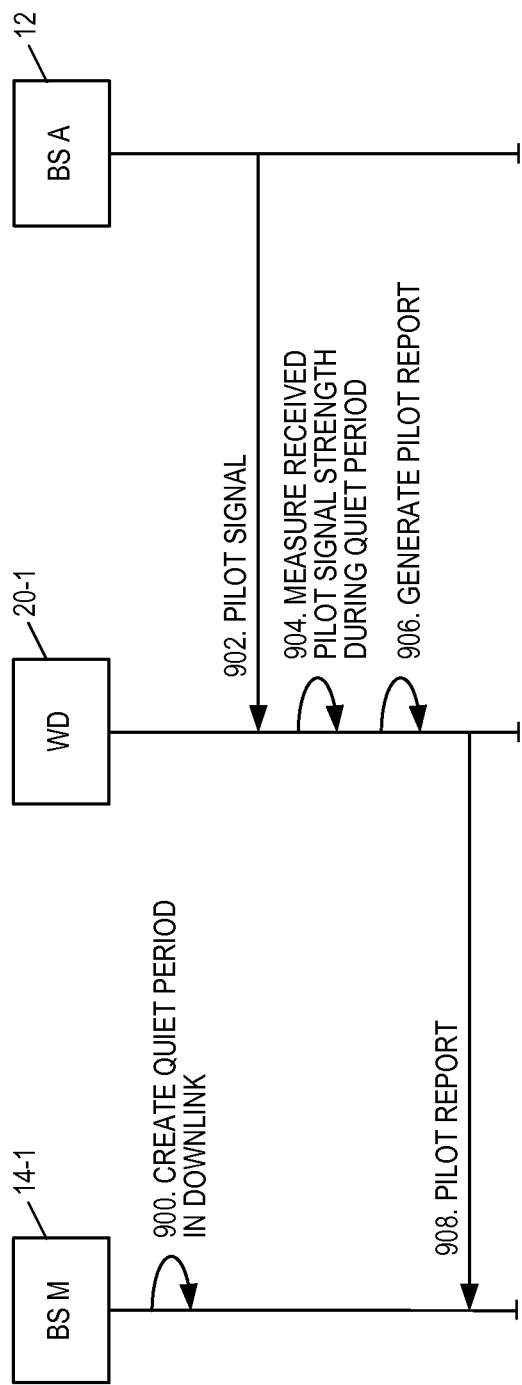
FIG. 12 illustrates a process by which pilot signal measurement is improved by utilizing a quiet period in a downlink for the measuring cell according to one embodiment of the present disclosure.

FIG. 12 illustrates an embodiment in which a quiet period is created in the downlink of a measuring cell to improve measurement of the pilot signal from a coverage cell according to one embodiment of the present disclosure. Again, for ease of discussion, the example of FIG. 1 is used. As illustrated, the small base station 14-1 creates a quiet period in the downlink for the measuring cell (cell M) (step 900). During the quiet period there is no traffic or at least reduced traffic on the downlink for the measuring cell (cell M). The macro base station 12 serving the covering cell (cell A) transmits its pilot signal (step 902). The wireless device 20-1 then receives and measures the pilot signal from the covering cell (cell A) during the quiet period created in the downlink from the measuring cell (cell M) (step 904). Due to the quiet period, measurement of the pilot signal from the covering cell (cell A) at the wireless device 20-1 is improved, particularly when the wireless device 20-1 is near the antenna of the small base station 14-1. The wireless device 20-1 then generates and sends a pilot report for the covering cell (cell A) to the small base station 14-1, as discussed above (step 906 and 908).

Figure 13:
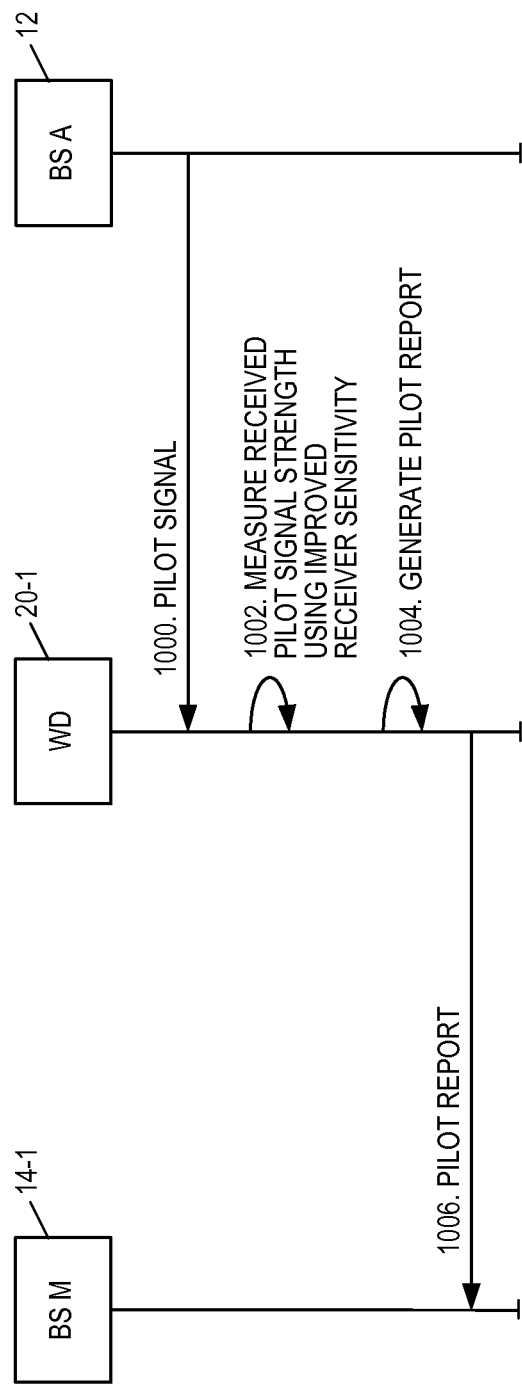
FIG. 13 illustrates a process by which pilot signal measurement is improved by utilizing improved receiver sensitivity according to one embodiment of the present disclosure.

FIG. 13 illustrates an embodiment in which improved receiver sensitivity is utilized to improve measurement of the pilot signal from a coverage cell according to one embodiment of the present disclosure. Again, for ease of discussion, the example of FIG. 1 is used. As illustrated, the macro base station 12 serving the covering cell (cell A) transmits its pilot signal (step 1000). The wireless device 20-1 then receives the pilot signal via a receiver having improved sensitivity and measures the pilot signal from the covering cell (cell A) (step 1002). Due to the improved receiver sensitivity, measurement of the pilot signal from the covering cell (cell A) at the wireless device 20-1 is improved, particularly when the wireless device 20-1 is near the antenna of the small base station 14-1. The wireless device 20-1 then generates and sends a pilot report for the covering cell (cell A) to the small base station 14-1, as discussed above (step 1004 and 1006).

Figure 14:
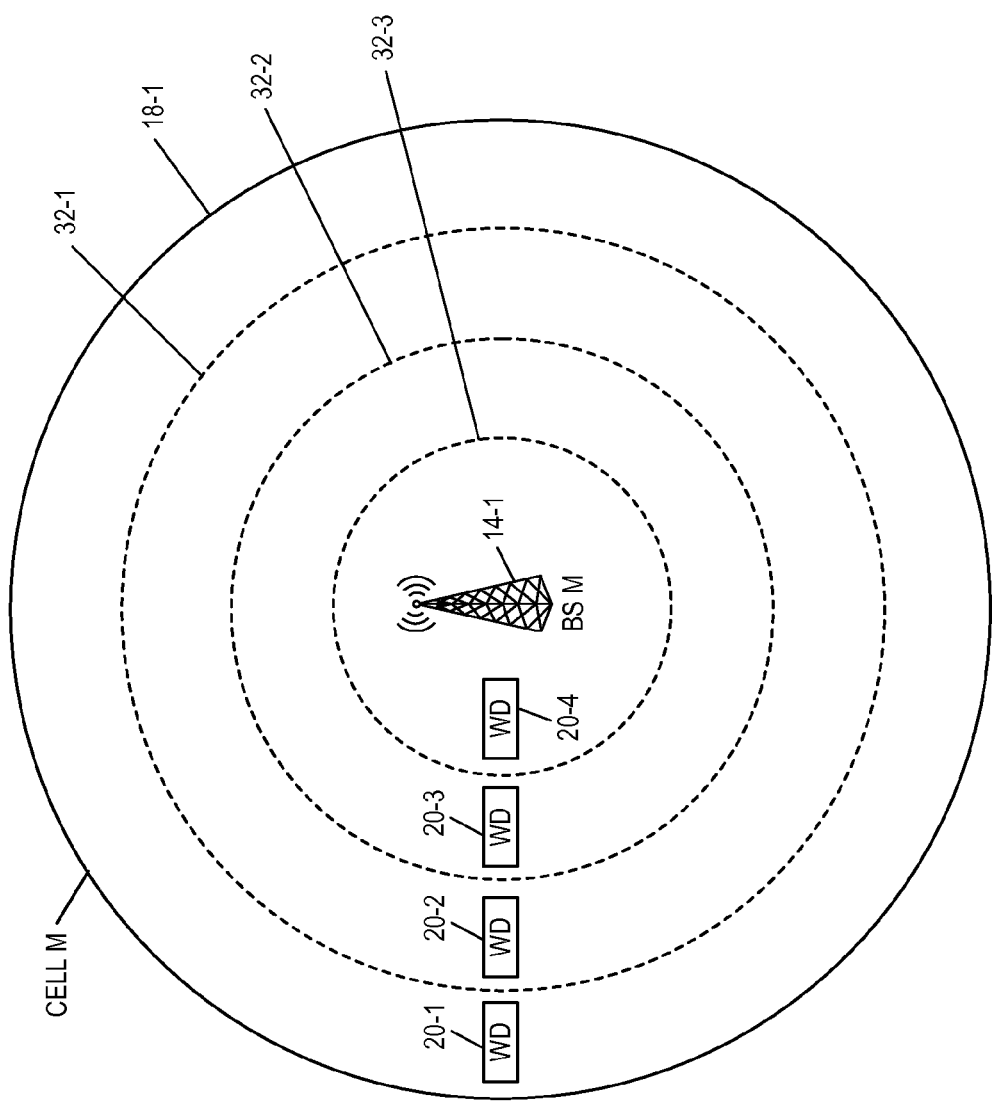
FIG. 14 illustrates a process by which pilot signal measurement is improved by gradually reducing a maximum transmit power of a base station serving the measuring cell according to one embodiment of the present disclosure.

FIG. 14 graphically illustrates the operation of a base station of a measuring cell to gradually wilt, or reduce, its transmit power in order to assist in the measurement of pilot signals from covering cells (not shown) according to one embodiment of the present disclosure. Again, for ease of discussion, the example of FIG. 1 is used. In this embodiment, the small base station 14-1 gradually wilts, or reduces, its maximum output power from a maximum value that corresponds to the outer boundary of the small cell 18-1, to a first reduced output power that corresponds to a first reduced boundary 32-1 of the small cell 18-1, to a second reduced output power that corresponds to a second reduced boundary 32-2 of the small cell 18-1, to a third reduced output power that corresponds to a third reduced boundary 32-3 of the small cell 18-1, to some minimum value. In this example, as the maximum output power is reduced, the wireless devices 20-1, 20-2, 20-3, and 20-4 (in that order) either handover to other cells or remain connected to the small cell 18-1 but are enabled to improve reception and measurement of the pilot signals from the coverage cells (not shown) due to the reduced maximum transmit power of the small base station 14-1.

Figure 15:
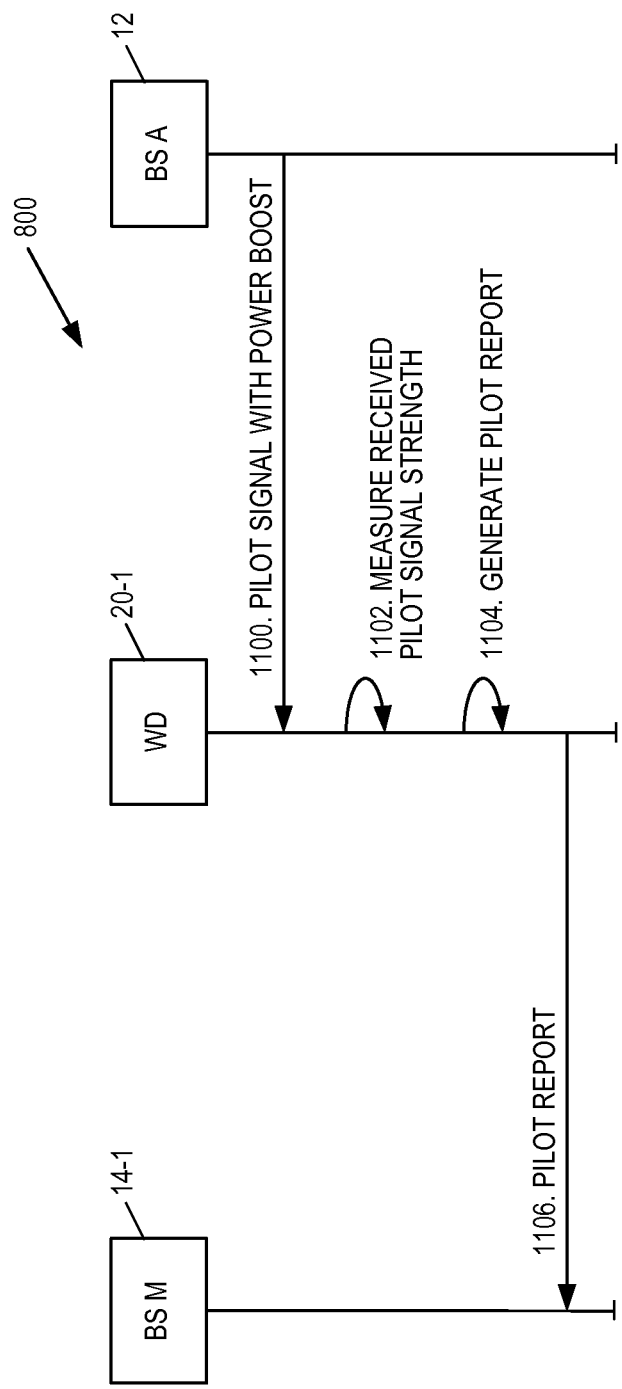
FIG. 15 illustrates a process by which pilot signal measurement is improved by utilizing power boosting for transmission of pilot signal for a covering cell according to one embodiment of the present disclosure.

FIG. 15 illustrates an embodiment in which power boosting of the pilot signal from a covering cell is utilized to improve measurement of the pilot signal from the covering cell according to one embodiment of the present disclosure. Again, for ease of discussion, the example of FIG. 1 is used. As illustrated, the macro base station 12 serving the covering cell (cell A) transmits its pilot signal using a power boosting technique (step 1100). Any suitable power boosting technique may be used. The wireless device 20-1 then receives and measures the pilot signal from the covering cell (cell A) (step 1102). Due to the power boosting, measurement of the pilot signal from the covering cell (cell A) at the wireless device 20-1 is improved, particularly when the wireless device 20-1 is near the antenna of the small base station 14-1. The wireless device 20-1 then generates and sends a pilot report for the covering cell (cell A) to the small base station 14-1, as discussed above (step 1104 and 1106).

Although the described embodiments may be implemented in any appropriate type of telecommunications system supporting any suitable communication standards and using any suitable components, particular embodiments of the described solutions may be implemented in an LTE cellular communications network, such as the example network shown in FIG. 1 above. Although the wireless devices 20 in the example network may represent communication devices that include any suitable combination of hardware and/or software, the wireless devices 20 may, in particular embodiments, represent a device such as the one illustrated in greater detail in FIG. 16. Similarly, although the illustrated radio network nodes (e.g., the macro and small base stations 12 and 14) may represent radio network nodes that include any suitable combination of hardware and/or software, these network nodes may, in particular embodiments, represent devices such as the radio network node 34 illustrated in greater detail in FIG. 17.

As shown in FIG. 16, the example wireless device 20 includes a processor 36, a memory 38, a transceiver 40, and one or more antennas 42. In particular embodiments, some or all of the functionality described above as being provided by the wireless device 20 may be provided by the processor 36 executing instructions stored on a computer-readable medium, such as the memory 38 shown in FIG. 16. Alternative embodiments of the wireless device 20 may include additional components beyond those shown in FIG. 16 that may be responsible for providing certain aspects of the device's functionality, including any of the functionality described above and/or any functionality necessary to support the embodiments described above.

As shown in FIG. 17, the example radio network node 34 includes a baseband unit 44 including a processor 46, a memory 48, and a network interface 50 and a radio unit 52 including a transceiver 54 connected to one or more antennas 56. In particular embodiments, some or all of the functionality described above as being provided by the macro base station 12, the macro cell 16, the small base stations 14, the small cells 18, the measuring cell, or the covering cells may be provided by the processor 46 executing instructions stored on a computer-readable medium, such as the memory 48 shown in FIG. 17. Alternative embodiments of the radio network node 34 may include additional components responsible for providing additional functionality, including any of the functionality identified above and/or any functionality necessary to support the embodiments described above.

Figure 18:
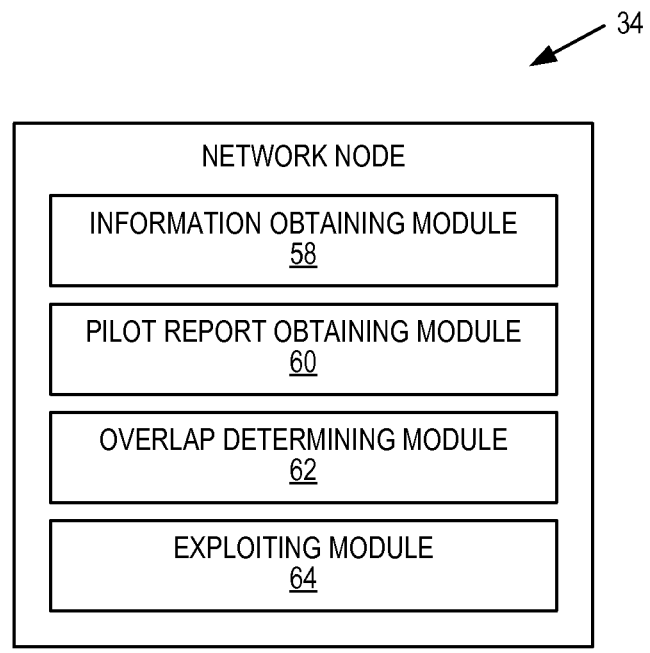
FIG. 18 is a function, or virtual, block diagram of one example of a radio network node.

FIG. 18 is a functional, or virtual, block diagram of the radio network node 34 of FIG. 17 according to one embodiment of the present disclosure. As illustrated, in accordance with the various methods of operation of a network node disclosed herein (e.g., FIGS. 2 and 3), the radio network node 34 includes an information obtaining module 58 for obtaining the information that is indicative of the positions of the wireless devices 20 within the measuring cell (cell M), a pilot report obtaining module 60 for obtaining the pilot reports generated by the wireless devices 20 for the covering cell(s), and an overlap determining module 62 for determining the coverage overlap between the measuring cell (cell M) and the covering cell(s), as described above. Note that the information obtaining module 58 may not be included in some embodiments. In addition, the radio network node 34 may include an exploiting module for exploiting the overlapping coverage. Each of the modules 58-64 operates according to at least one of the embodiments described above. Further, the modules 58-64 are implemented in hardware or any combination of hardware and software. For example, in one embodiment, the modules 58-64 are implemented in software that is stored by a computer readable medium (e.g., the memory 48) and executed by a processor (e.g., the processor 46) of the radio network node 34. Further, while the modules 58-64 are described with respect to the radio network node 34 (e.g., the base station of the measuring cell (cell M)), the modules 58-64 may be implemented in any suitable network node.

The following acronyms are used throughout this disclosure.

3GPP 3$^{rd}$ Generation Partnership Project
AP Access Point
BS Base Station
BTS Base Transceiver Station
CDMA2000 Code Division Multiple Access 2000
CQI Channel Quality Indictor (or Index)
eMBMS Evolved Multimedia Broadcast Multicast Service
eNB Enhanced Node B
E-SMLC Evolved Serving Mobile Location Center FDD Frequency Division Duplex
GPS Global Positioning System
GSM Global System for Mobile Communications
HO Hand-Off/Hand-Over
HPN High Power Nodes
HSPA High Speed Packet Access
ID Identifier
LEE Laptop Embedded Equipment
LME Laptop Mounted Equipment
LPN Low Power Nodes
LTE Long Term Evolution
MDT Mobile Data Terminal
MME Mobility Management Entity
MSC Mobile Switching Center
MSR Multi-Standard Radio
O&M Operations and Maintenance
OSS Object Storage Server
PDA Personal Digital Assistant
PRAT Rated Output Power
RAN Radio Access Network
RAT Radio Access Technology
RF Radio Frequency
RSSI Received Strength of Signal Indication
S1 Interface between eNB and MME for control plane traffic
SIC Successive Interference Cancellation
SINR Signal-to-Interference-plus-Noise Ratio
SON Self Organizing Network
SRS Sounding Reference Symbols
TDD Time Division Duplex
UE User Equipment
UMTS Universal Mobile Telecommunications System
USB Universal Serial Bus
WD Wireless Device Those skilled in the art will recognize improvements and modifications to the preferred embodiments of the present disclosure. All such improvements and modifications are considered within the scope of the concepts disclosed herein and the claims that follow.

What is claimed is:

1. A method of operation of a network node of a cellular communications network, comprising:
    obtaining, based on communication with a plurality of wireless devices within a measuring cell, information that is indicative of positions, including range, of the plurality of wireless devices within the measuring cell and information that is indicative of a perceived coverage of one or more covering cells at the plurality of wireless devices;
    determining overlapping coverage of the measuring cell and the one or more covering cells based on the information that is indicative of the positions of the plurality of wireless devices within the measuring cell and the information indicative of the perceived coverage of the one or more covering cells at the plurality of wireless devices; and
    using the overlapping coverage.

2. The method of claim 1, wherein:
    the information indicative of the perceived coverage of the one or more covering cells at the plurality of wireless devices comprises pilot reports generated by the plurality of wireless devices for the one or more covering cells; and
    determining overlapping coverage comprises determining overlapping coverage of the measuring cell and the one or more covering cells based on the pilot reports generated by the plurality of wireless devices for the one or more covering cells over a measurement interval.

3. The method of claim 2 wherein determining overlapping coverage of the measuring cell and the one or more covering cells comprises determining overlapping coverage of the measuring cell and the one or more covering cells based on the information that is indicative of the positions of the plurality of the wireless devices within the measuring cell over the measurement interval and the pilot reports generated by the plurality of wireless devices for the one or more covering cells over the measurement interval.

4. The method of claim 3, wherein the information that is indicative of the positions of the plurality of wireless devices comprises Channel Quality Indicator (CQI) values reported by the plurality of wireless devices for the measuring cell.

5. The method of claim 3, wherein the information that is indicative of the positions of the plurality of wireless devices comprises ranging information for the plurality of wireless devices with respect to the measuring cell.

6. The method of claim 3, wherein the information that is indicative of the positions of the plurality of wireless devices comprises any combination of one or more of a group consisting of: Channel Quality Indicator (CQI) values reported by the plurality of wireless devices for the measuring cell, Received Signal Strength Indicator (RSSI) measurements reported by the plurality of wireless devices for the measuring cell, RSSI measurements made by a base station serving the measuring cell with respect to the plurality of wireless devices, Signal-to-Interference-plus-Noise Ratio (SINR) measurements made by the base station serving the measuring cell with respect to the plurality of wireless devices, ranging information for the plurality of wireless devices with respect to the measuring cell, beamforming indices utilized for the plurality of wireless devices with respect to the measuring cell, and ancillary position information for the plurality of wireless devices.

7. The method of claim 3, wherein each pilot report includes a received pilot strength measured at a corresponding one of the plurality of wireless devices for a pilot signal transmitted by a corresponding one of the one or more covering cells.

8. The method of claim 3, wherein determining overlapping coverage of the measuring cell and the one or more covering cells based on the information that is indicative of the positions of the plurality of the wireless devices within the measuring cell over the measurement interval and the pilot reports generated by the plurality of wireless devices for the one or more covering cells over the measurement interval comprises:
    processing the information that is indicative of the positions of the plurality of wireless devices within the measuring cell and the pilot reports to provide data indicative of overlapping coverage; and
    determining the overlapping coverage based on the data.

9. The method of claim 8, wherein processing the information that is indicative of the positions of the plurality of wireless devices within the measuring cell and the pilot reports includes correlating each pilot report to a corresponding one of a plurality of ranges of values for the information to provide correlated data.

10. The method of claim 9, wherein each range of the plurality of ranges of values for the information is a range of average Channel Quality Indicator (CQI) values.

11. The method of claim 9, wherein processing the information and the pilot reports further includes, for each combination of one of the plurality of ranges of values for the information and one of the one or more covering cells:
 determining a total number of the pilot reports received for the combination that report a received pilot strength above a threshold value.

12. The method of claim 11, wherein the threshold value is the same for each combination of one of the plurality of ranges of values for the information and one of the one or more covering cells.

13. The method of claim 11, wherein a threshold value of a first combination of one of the plurality of ranges of values for the information and one of the one or more covering cells is different from a threshold value of a second combination of one of the plurality of ranges of values for the information and one of the one or more covering cells.

14. The method of claim 11, wherein determining the overlapping coverage comprises, for each combination of one of the plurality of ranges of values and one of the one or more covering cells, determining overlapping coverage based upon the total number of the pilot reports received for the combination that report a received pilot strength above the threshold value.

15. The method of claim 11, wherein determining the overlapping coverage comprises, for each combination of one of the plurality of ranges of values and one of the one or more covering cells, determining overlapping coverage based upon a ratio of:
 (a) the total number of the pilot reports received for the combination that report a received pilot strength above the threshold value, and
 (b) a sum of:
  (i) the total number of the pilot reports received for the combination that report a received pilot strength above the threshold value, and
  (ii) a number of wireless devices in the measured cell at the one of the plurality of ranges of values that did not report a received pilot strength for the one of the one or more covering cells above the threshold value.

16. The method of claim 1, wherein using the overlapping coverage comprises at least one of a group consisting of:
 exploiting the overlapping coverage by the network node; and
 providing the overlapping coverage to another network node.

17. The method of claim 1, wherein determining overlapping coverage includes determining whether each of the one or more covering cells completely overlaps, partially overlaps, or does not overlap the measuring cell.

18. The method of claim 1, further comprising updating the overlapping coverage according to an update scheme that gradually updates the overlapping coverage over time.

19. The method of claim 1, wherein the network node of the cellular communications network is a base station serving the measuring cell.

20. The method of claim 1, further comprising taking one or more actions to reduce interference from the measuring cell to at least one of a group consisting of: (a) synchronization signals from at least one of the one or more covering cells and (b) pilot measurements generated by at least some of the plurality of wireless devices for the one or more covering cells.

21. The method of claim 1, wherein the network node is a base station serving the measuring cell, and the method further comprises using a frequency offset between pilot signals of the measuring cell and the one or more covering cells.

22. The method of claim 1, wherein the network node is a base station serving the measuring cell, and the method further comprises using a quiet period in a downlink of the measuring cell to reduce traffic during one or more intervals in which at least some of the plurality of wireless devices are to measure received pilot signal strengths for at least one of the one or more covering cells.

23. The method of claim 2, wherein the network node is a base station serving the measuring cell, and the method further comprises:
 gradually reducing a transmit power for a downlink signal of the measuring cell;
 wherein at least some of the pilot reports generated by at least some of the plurality of wireless devices are generated by the at least some of the plurality of wireless devices while the transmit power for the downlink signal of the measuring cell is gradually reduced.

24. The method of claim 1, wherein the network node is a base station serving the measuring cell, and the method further comprises reducing a bandwidth of a radiated signal transmitted for the measuring cell to thereby provide clear space where at least some of the plurality of wireless devices are better able to hear transmissions from the one or more covering cells.

25. The method of claim 1, wherein the network node is a base station serving the measuring cell, and the method further comprises using empty Evolved Multimedia Broadcast Multicast Service (eMBMS) eMBMS subframes to provide symbols in which there is no pilot interference from the measuring cell.

26. The method of claim 1, further comprising providing information regarding the overlapping coverage determined for the measuring cell and the one or more covering cells to another network node.

27. The method of claim 1, wherein the network node obtains the information that is indicative of the positions of the plurality of wireless devices within the measuring cell and the information indicative of the perceived coverage of the one or more covering cells at the plurality of wireless devices directly from the plurality of wireless devices.

28. The method of claim 1, wherein the network node obtains the information that is indicative of the positions of the plurality of wireless devices within the measuring cell and the information indicative of the perceived coverage of the one or more covering cells at the plurality of wireless devices indirectly from network nodes other than the plurality of wireless devices.

29. The method of claim 1, wherein the network node is a base station that obtains information based on communication between itself and the plurality of wireless devices.

30. The method of claim 1, wherein the network node is a node other than a base station that obtains information based on communication between a second network node and the plurality of wireless devices.

31. A network node of a cellular communications network comprising:
 a processor; and
 memory containing instructions executable by the processor whereby the network node is operative to:
  obtain, based on communication with a plurality of wireless devices within a measuring cell, information that is indicative of the positions, including range, of the plurality of wireless devices within the measuring cell and information indicative of a perceived coverage of one or more covering cells at the plurality of wireless devices;
  determine overlapping coverage of the measuring cell and the one or more covering cells based on the information that is indicative of the positions of the plurality of wireless devices within the measuring cell and the information indicative of the perceived coverage of the one or more covering cells at the plurality of wireless devices; and exploiting the overlapping coverage.

* * * * *